US011478899B2

(12) United States Patent
Lukowski et al.

(10) Patent No.: US 11,478,899 B2
(45) Date of Patent: Oct. 25, 2022

(54) SHAPED VITRIFIED ABRASIVE AGGLOMERATE WITH SHAPED ABRASIVE PARTICLES, ABRASIVE ARTICLES, AND RELATED METHODS

(71) Applicant: 3M INNOVATIVE PROPERTIES COMPANY, St. Paul, MN (US)

(72) Inventors: Mark A. Lukowski, St. Paul, MN (US); Negus B. Adefris, St. Paul, MN (US); Scott W. Peterson, Highlands Ranch, CO (US); Brian D. Goers, Minneapolis, MN (US); Rebecca A. Putans, Midland, MI (US); Bridgette R. Shannon, Woodbury, MN (US); Thomas J. Nelson, Woodbury, MN (US); Jacob S. Beveridge, Lake Elmo, MN (US)

(73) Assignee: 3M Innovative Properties Company, St. Paul, MN (US)

( * ) Notice: Subject to any disclaimer, the term of this patent is extended or adjusted under 35 U.S.C. 154(b) by 27 days.

(21) Appl. No.: 16/344,697

(22) PCT Filed: Oct. 25, 2017

(86) PCT No.: PCT/US2017/058254
§ 371 (c)(1),
(2) Date: Apr. 24, 2019

(87) PCT Pub. No.: WO2018/081246
PCT Pub. Date: May 3, 2018

(65) Prior Publication Data
US 2020/0047313 A1  Feb. 13, 2020

Related U.S. Application Data

(60) Provisional application No. 62/412,552, filed on Oct. 25, 2016.

(51) Int. Cl.
B24D 3/34 (2006.01)
B24D 18/00 (2006.01)
C09K 3/14 (2006.01)

(52) U.S. Cl.
CPC ......... B24D 3/346 (2013.01); B24D 18/0009 (2013.01); C09K 3/1409 (2013.01)

(58) Field of Classification Search
CPC ... B24D 3/346; B24D 18/0009; C09K 3/1409
See application file for complete search history.

(56) References Cited

U.S. PATENT DOCUMENTS 2,958,593 A   11/1960   Hoover
4,314,827 A   2/1982    Leitheiser
(Continued)

FOREIGN PATENT DOCUMENTS

WO   WO 1993-012911   7/1993
WO   WO 2015-088953   6/2015

OTHER PUBLICATIONS

International Search Report from International Application No. PCT/US2017/058254, dated Feb. 6, 2018, 6 pages.

*Primary Examiner* — Pegah Parvini
(74) *Attorney, Agent, or Firm* — Kathleen B. Gross

(57) ABSTRACT

A shaped abrasive agglomerate particle includes a shaped abrasive particle bonded in a vitreous matrix. The shaped abrasive particles have a longest particle lineal dimension on a surface and a shortest particle dimension perpendicular to the longest particle lineal dimension, and the longest particle lineal dimension is at least twice the shortest particle dimension. The shaped abrasive agglomerate particle has a longest agglomerate lineal dimension on a surface and a shortest agglomerate dimension perpendicular to the longest agglomerate lineal dimension, and the longest agglomerate lineal dimension is at least twice the shortest agglomerate dimension. The abrasive agglomerate particles are useful in (Continued)

abrasive articles. Methods of making the shaped abrasive agglomerate particle and abrading a workpiece are also described.

19 Claims, 4 Drawing Sheets

(56) References Cited

U.S. PATENT DOCUMENTS

| | | | |
|---|---|---|---|
| 4,518,397 A | 5/1985 | Leitheiser | |
| 4,623,364 A | 11/1986 | Cottringer | |
| 4,652,274 A | 3/1987 | Boettcher | |
| 4,744,802 A | 5/1988 | Schwabel | |
| 4,751,138 A | 6/1988 | Tumey | |
| 4,770,671 A | 9/1988 | Monroe | |
| 4,881,951 A | 11/1989 | Wood | |
| 4,903,440 A | 2/1990 | Larson | |
| 4,960,441 A | 10/1990 | Pellow | |
| 4,985,340 A | 1/1991 | Palazzotto | |
| 5,086,086 A | 2/1992 | Brown-Wensley | |
| 5,139,978 A | 8/1992 | Wood | |
| 5,164,348 A | 11/1992 | Wood | |
| 5,201,916 A | 4/1993 | Berg | |
| 5,213,591 A | 5/1993 | Celikkaya | |
| 5,236,472 A | 8/1993 | Kirk | |
| 5,366,523 A | 11/1994 | Rowenhorst | |
| 5,376,428 A | 12/1994 | Palazzotto | |
| 5,385,954 A | 1/1995 | Palazzotto | |
| 5,427,595 A | 6/1995 | Pihl | |
| 5,429,647 A | 7/1995 | Larmie | |
| 5,443,906 A | 8/1995 | Pihl | |
| 5,498,269 A | 3/1996 | Larmie | |
| 5,547,479 A | 8/1996 | Conwell | |
| 5,551,959 A * | 9/1996 | Martin | B24D 3/004 51/295 |
| 5,551,963 A | 9/1996 | Larmie | |
| 5,591,239 A | 1/1997 | Larson | |
| RE35,570 E | 7/1997 | Rowenhorst | |
| 5,651,801 A | 7/1997 | Monroe | |
| 5,679,067 A | 10/1997 | Johnson | |
| 5,725,162 A | 3/1998 | Garg | |
| 5,903,951 A | 5/1999 | Ionta | |
| 5,975,988 A | 11/1999 | Christianson | |
| 5,984,988 A | 11/1999 | Berg | |
| 6,017,831 A | 1/2000 | Beardsley | |
| 6,054,093 A | 4/2000 | Torre, Jr. | |
| 6,217,413 B1 | 4/2001 | Christianson | |
| 6,277,161 B1 | 8/2001 | Castro | |
| 6,319,108 B1 | 11/2001 | Adefris | |
| 6,354,929 B1 | 3/2002 | Adefris | |
| 6,645,624 B2 | 11/2003 | Adefris | |
| 6,702,650 B2 | 3/2004 | Adefris | |
| 6,722,952 B2 | 4/2004 | Goers | |
| 6,817,935 B2 | 11/2004 | Bates | |
| 6,951,504 B2 | 10/2005 | Adefris | |
| 7,344,574 B2 | 3/2008 | Thurber | |
| 7,887,608 B2 | 2/2011 | Schwabel | |
| 8,034,137 B2 | 10/2011 | Erickson | |
| 8,123,828 B2 | 2/2012 | Culler | |
| 8,142,531 B2 | 3/2012 | Adefris | |
| 8,142,532 B2 | 3/2012 | Erickson | |
| 8,142,891 B2 | 3/2012 | Culler | |
| 8,251,774 B2 | 8/2012 | Joseph | |
| 8,764,865 B2 | 7/2014 | Boden | |
| 10,058,970 B2 | 8/2018 | Gagliardi | |
| 10,350,732 B2 | 7/2019 | Lukowski | |
| 2002/0160694 A1 | 10/2002 | Wood | |
| 2003/0213182 A1 * | 11/2003 | Knapp | B24D 3/14 51/295 |
| 2006/0041065 A1 | 2/2006 | Barber, Jr. | |
| 2007/0084133 A1 * | 4/2007 | Schwabel | B24D 18/00 51/307 |
| 2010/0319269 A1 | 12/2010 | Erickson | |
| 2011/0183142 A1 | 7/2011 | Gebhardt | |
| 2014/0080393 A1 | 3/2014 | Ludwig | |
| 2015/0052824 A1 | 2/2015 | Gebhardt | |
| 2015/0052825 A1 | 2/2015 | Adefris | |
| 2015/0267097 A1 * | 9/2015 | Rosenflanz | B24D 3/16 451/28 |
| 2019/0185636 A1 | 6/2019 | Goers | |
| 2019/0283216 A1 | 9/2019 | Lukowski | |
| 2021/0002533 A1 | 1/2021 | Skorina | |

* cited by examiner

SHAPED VITRIFIED ABRASIVE AGGLOMERATE WITH SHAPED ABRASIVE PARTICLES, ABRASIVE ARTICLES, AND RELATED METHODS

CROSS REFERENCE TO RELATED APPLICATIONS

This application is a national stage filing under 35 U.S.C. 371 of PCT/US2017/058254, filed Oct. 25, 2017, which claims the benefit of U.S. Application No. 62/412,552, filed Oct. 25, 2016, the disclosure of which is incorporated by reference in its entirety herein.

BACKGROUND

Shaped abrasive agglomerates including various abrasive particles in a ceramic matrix have been disclosed in U.S. Pat. No. 5,975,988 (Christianson), U.S. Pat. Nos. 6,319,108, 6,702,650, and 6,951,504 (each to Adefris) and in Int. Pat. Appl. Pub. No. WO2015/088953 (Kasai). Shaped abrasive agglomerates including shaped abrasive particles in an organic resin matrix have been disclosed in U.S. Pat. Appl. Pub. No. 2014/0080393 (Ludwig).

Shaped abrasive particles produced by molding a sol-gel, drying, and sintering the dried sol-gel to obtain shaped ceramic abrasive particles have been described in U.S. Pat. No. 5,201,916 (Berg), U.S. Pat. No. 5,984,988 (Berg), Re. 35,570 (Rowenhorst), U.S. Pat. No. 8,034,137 (Erickson), U.S. Pat. No. 8,123,828 (Culler), U.S. Pat. No. 8,142,531 (Adefris), U.S. Pat. No. 8,142,891 (Culler), U.S. Pat. No. 8,142,532 (Erickson), and U.S. Pat. No. 8,764,865 (Boden), and U.S. Pat. Appl. Pub. Nos. 2010/0319269 (Erickson) and 2015/0052825 (Adefris).

SUMMARY

Excellent grinding performance and a long working life are desirable characteristics for abrasive articles. An inconsistent cut-rate over the life of an abrasive tool is a problem encountered when abrading a workpiece. Shaped abrasive agglomerate particles according to the present disclosure can be useful for providing abrasive articles that can exhibit unexpected grinding performance, extended life, and stable cut-rates over that extended life when compared to shaped agglomerates having more blocky shapes and agglomerates including crushed abrasive grains.

In one aspect, the present disclosure provides a shaped abrasive agglomerate particle that includes shaped abrasive particles bonded in a vitreous matrix. The shaped abrasive particles have a longest particle lineal dimension on a surface and a shortest particle dimension perpendicular to the longest particle lineal dimension, and the longest particle lineal dimension is at least twice the shortest particle dimension. The shaped abrasive agglomerate particle also has a longest agglomerate lineal dimension on a surface and a shortest agglomerate dimension perpendicular to the longest agglomerate lineal dimension, and the longest agglomerate lineal dimension is at least twice the shortest agglomerate dimension.

In another aspect, the present disclosure provides an abrasive article including a plurality of the shaped abrasive agglomerate particles retained in a binder.

In another aspect, the present disclosure provides a method of abrading a workpiece. The method includes contacting a workpiece with the abrasive article described above and below and moving the workpiece and the abrasive article relative to each other to abrade the workpiece.

In another aspect, the present disclosure provides a method of making a plurality of the shaped abrasive agglomerate particles. The method includes filling a mold having a plurality of cavities with a slurry comprising a glass frit, the shaped abrasive particles, and a volatile liquid, removing at least a portion of the volatile liquid to provide shaped precursor agglomerate particles, and firing the shaped precursor agglomerate particles to provide the shaped abrasive agglomerate particles.

In another aspect, the present disclosure provides a method of making a plurality of the shaped abrasive agglomerate particles. The method includes filling a mold having a plurality of cavities with a mixture comprising a glass frit, the shaped abrasive particles, and a temporary organic binder, at least one of heating or irradiating the mixture to provide shaped precursor agglomerate particles, and firing the shaped precursor agglomerate particles to provide the shaped abrasive agglomerate particles.

In this application, terms such as "a", "an" and "the" are not intended to refer to only a singular entity, but include the general class of which a specific example may be used for illustration. The terms "a", "an", and "the" are used interchangeably with the term "at least one".

The phrases "at least one of" and "comprises at least one of" followed by a list refers to any one of the items in the list and any combination of two or more items in the list.

The term "ceramic" as used herein refers to glasses, crystalline ceramics, glass-ceramics, and combinations thereof.

The term "vitreous matrix" as used herein refers to a glassy matrix. A glassy matrix may contain some crystalline domains (e.g., in a glass-ceramic).

As used herein, the terms "shaped abrasive particle" and "shaped abrasive agglomerate particle" refer to an abrasive particle or an abrasive agglomerate particle with at least a portion of the particle having a predetermined shape that is replicated from a mold cavity used to form the shaped precursor abrasive particle. Generally, the shaped abrasive particle and shaped abrasive agglomerate particle has at least two dimensions that are predetermined in this manner. In the case of a mold cavity open to air on one or two sides, shaped abrasive agglomerate particle and/or shaped abrasive particle may have a face that is not planar, but the particles would still be considered to have a predetermined shape. Except in the case of abrasive shards (e.g. as described in U.S. Pat. No. 8,034,137 (Erickson)), the shaped abrasive particle will generally have a predetermined geometric shape that substantially replicates the mold cavity that was used to form the shaped abrasive particle. In the case of abrasive shards, the shaped abrasive particle will generally have at least one face or at least portions of two sides that substantially replicates the mold cavity that was used to form the shaped abrasive particle. Shaped abrasive particle as used herein excludes abrasive particles obtained by a mechanical crushing operation.

Longest lineal dimensions for the shaped abrasive particles and shaped abrasive agglomerate particles are measured on a surface as opposed to a body diagonal. Lineal dimensions are generally measured on the edges in embodiments in which the shaped agglomerate abrasive particles and shaped abrasive particles have regular shapes.

All numerical ranges are inclusive of their endpoints and integral and non-integral values between the endpoints unless otherwise stated (e.g. 1 to 5 includes 1, 1.5, 2, 2.75, 3, 3.80, 4, and 5).

The above summary of the present disclosure is not intended to describe each disclosed embodiment or every implementation of the present disclosure. The description that follows more particularly exemplifies illustrative embodiments. It is to be understood, therefore, that the following description should not be read in a manner that would unduly limit the scope of this disclosure.

While the above-identified drawings and figures set forth embodiments of this disclosure, other embodiments are also contemplated, as noted in the Detailed Description. In all cases, this disclosure presents the invention by way of representation and not limitation. It should be understood that numerous other modifications and embodiments can be devised by those skilled in the art, which fall within the scope of this disclosure. The figures may not be drawn to scale.

DETAILED DESCRIPTION

Figure 1A:
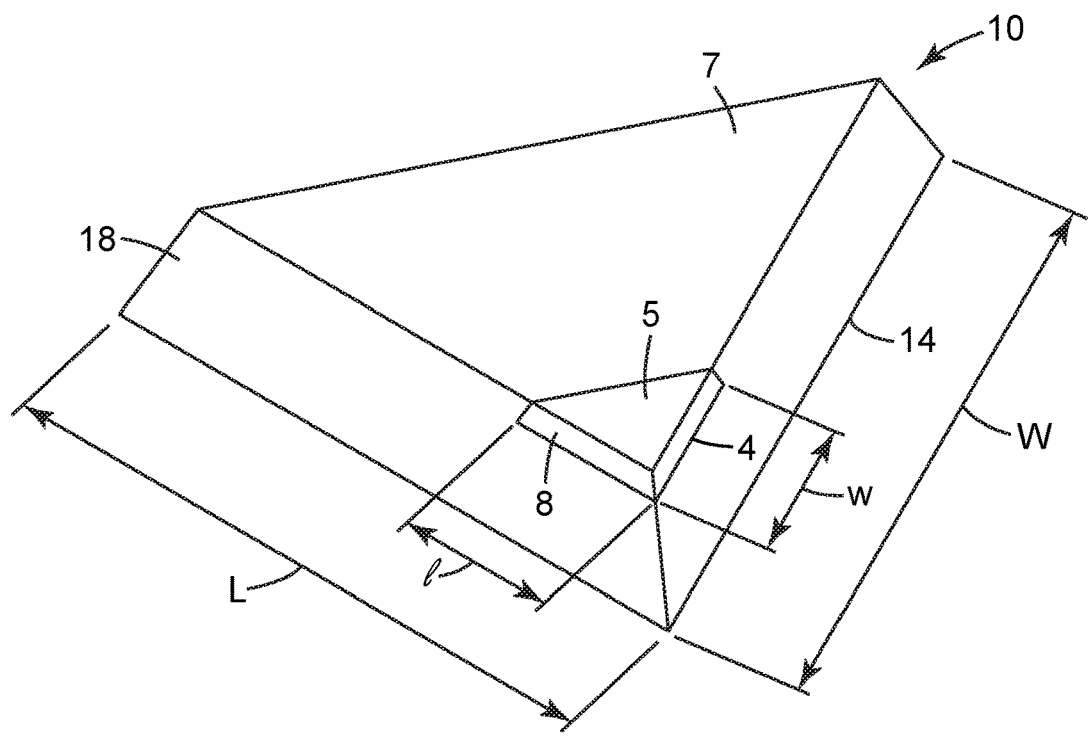
FIG. 1A is a simplified, perspective view of an embodiment of a shaped abrasive agglomerate particle according to the present disclosure including a shaped abrasive particle.

Referring to FIG. 1A, an embodiment of a shaped abrasive agglomerate particle 10 is illustrated. Shaped abrasive agglomerate particle 10 includes shaped abrasive particles 5 bonded in a vitreous matrix 7. The shaped abrasive agglomerate particle has a longest agglomerate lineal dimension on a surface L. Dimension W, which together with the longest agglomerate lineal dimension L typically helps define a second face 14 of the shaped abrasive agglomerate particle, may be the same length as or shorter than the longest lineal dimension L. The shaped abrasive particle 5 also has a longest lineal dimension on a surface 1. The dimension w that together with the longest particle lineal dimension 1 helps define a second face 4 of the shaped abrasive particle, may be the same length as or shorter than the longest particle lineal dimension 1.

FIG. 1A is a simplified view of an embodiment of a shaped abrasive agglomerate particle according to the present disclosure. FIG. 1A illustrates only one shaped abrasive particle 5 for simplicity, the shaped abrasive agglomerate particle 10 would generally have a plurality of shaped abrasive particles. In some embodiments, there are at least 10, 20, or 25 shaped abrasive particles 5 within the shaped abrasive agglomerate particle 10. In some embodiments, there are at least 3, 4, or 5 or up to 10 shaped abrasive particles along the longest agglomerate lineal dimension L of the shaped abrasive agglomerate particle 10. The shaped abrasive agglomerate particle may have an appearance, for example, such as that shown in FIG. 6.

Figure 1B:
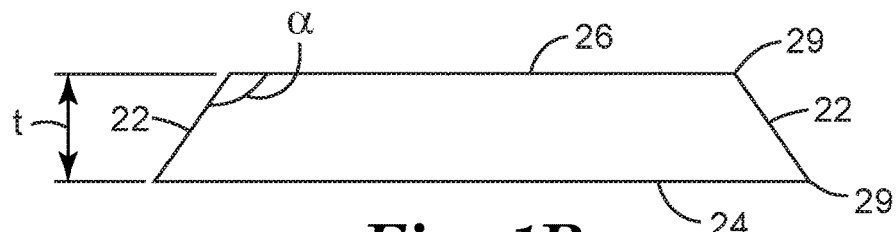
FIG. 1B illustrates a side view of the shaped abrasive agglomerate particle or the shaped abrasive particle shown in FIG. 1A.

FIG. 1B is an illustration of a side view of the shaped abrasive agglomerate particle 10 and/or the shaped abrasive particle 5 shown in FIG. 1A. Shaped abrasive agglomerate particle 10 has a shortest agglomerate dimension t perpendicular to the longest agglomerate lineal dimension on a surface L. The longest agglomerate lineal dimension on a surface L is at least twice the shortest agglomerate dimension t. In some embodiments, the longest agglomerate lineal dimension L is at least 3, 4, 5, or 10 times the shortest agglomerate dimension t. The thickness t can also be considered a distance between a first face 26 and a second face 24 of the shaped agglomerate particle. Likewise, shaped abrasive agglomerate particle 5 has a shortest dimension t perpendicular to the longest particle lineal dimension on a surface 1. The longest particle lineal dimension on a surface 1 is at least twice the shortest particle dimension t. In some embodiments, the longest particle lineal dimension 1 is at least 3, 4, 5, or 10 times the shortest particle dimension t. The thickness t can also be considered a distance between a first face 26 and a second face 24 of the shaped abrasive particle.

To facilitate removal from a mold used to make them, and, in some cases, to increase performance in abrading applications, at least one of shaped abrasive agglomerate particles 10 according to the present disclosure or the shaped abrasive particles 5 within them may be tapered corresponding a draft angle of the mold, for example, as described in U.S. Pat. No. 8,142,531 (Adefris et al.). Accordingly, in some embodiments, at least one of the shaped abrasive particle 5 or shaped abrasive agglomerate particle 10 has a sloping sidewall. In the embodiment illustrated in FIG. 1B, the first face 26 and the second face 24 are connected to each other by at least one sloping sidewall 22. In some embodiments, more than one sloping sidewall 22 can be present and the slope or angle for each sloping sidewall 22 may be the same as shown in FIG. 1B or different. Referring to FIG. 1B, an angle α between the first face 26 and the sloping sidewall 22 of the shaped abrasive agglomerate particle 10 and shaped abrasive particle 5 can be varied to change the relative sizes of each face. In some embodiments, at least one of the shaped abrasive particle or the shaped abrasive agglomerate particle has an angle α in a range from 95 degrees to 130 degrees between a first face and the sloping side wall. In various embodiments, the angle α can be between approximately 95 degrees to approximately 130 degrees, or between about 95 degrees to about 125 degrees, or between about 95 degrees to about 120 degrees, or between about 95 degrees to about 115 degrees, or between about 95 degrees to about 110 degrees, or between about 95 degrees to about 105 degrees, or between about 95 degrees to about 100 degrees. Three sloping sidewalls 22 make up the peripheral surface 8 of the shaped abrasive particles 5 and three sloping sidewalls 22 make up the peripheral surface 18 of the shaped abrasive agglomerate particles 10 shown in FIG. 1A.

Figure 2:
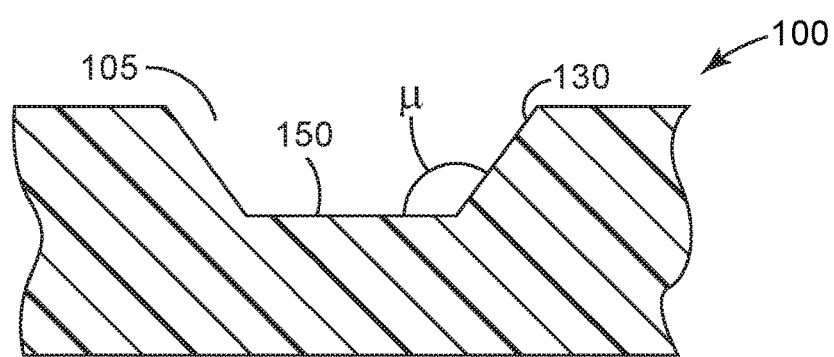
FIG. 2 is a schematic cross-section edge view of an embodiment of a mold for making the shaped abrasive particle or shaped abrasive agglomerate particle according to the present disclosure.

The angle between the first face 26 and the sloping sidewall 22 is typically determined by the draft angle of the molds used for making the shaped abrasive particles 5 and the shaped abrasive agglomerate particles 10. The term "draft angle" refers to an angle of taper, incorporated into a wall of a mold cavity so that the opening of the mold cavity is wider than its base. Referring now to FIG. 2, which shows a cross-section of mold 100 and mold cavity 105, draft angle μ is the angle between mold base 150 and mold wall 130. The draft angle can be varied to change the relative sizes of the first and second faces 26, 24 of shaped abrasive particles 5 and the shaped abrasive agglomerate particles 10. It may be useful to have a slightly rounded or radiused corner to thoroughly fill the mold with material and remove the shaped abrasive agglomerate particle or the shaped abrasive particle from the mold.

In other embodiments, the peripheral surface of at least one of the shaped abrasive agglomerate particles or shaped abrasive particles does not taper (i.e., sidewalls 22 in FIG. 1B may be vertical), and/or the first and second faces 26, 24 may have the same size and shape.

In some embodiments, the first face 26 is substantially planar, the second face 24 is substantially planar, or both the first and second faces 26, 24 are substantially planar. In other embodiments, the faces could be concave or convex as discussed in more detail in U.S. Pat. No. 8,142,891 (Culler et al.). Additionally, an opening or aperture through the faces could be present in some embodiments as discussed in more detail in U.S. Pat. No. 8,142,532 (Erickson et al.). In some embodiments, the first face 26 and the second face 24 are substantially parallel to each other. In other embodiments, the first face 26 and second face 24 can be nonparallel such that one face is sloped with respect to the other face and imaginary lines tangent to each face would intersect at a point. In some embodiments, the face at the air interface of the mold cavity 105 may not be planar.

In some embodiments, the perimeters 29 of the first face 26 and second face 24 are selected to be a geometric shape, and the first face 26 and the second face 24 are selected to have the same geometric shape, although they differ in size with the second face 24 being larger than the first face 26. In these embodiments, at least one of the shaped abrasive agglomerate particle according to the present disclosure or the shaped abrasive particle included in it is frusto-pyramidal, which may also be referred to as a truncated pyramid. In these embodiments, the first and second faces may have a variety of useful shapes. In some embodiments, at least one of the shaped abrasive particle or the shaped agglomerate particle has a triangular frustum shape, a square frustum shape, or a hexagonal frustum shape.

In other embodiments in which the first face 26 and the second face 24 are congruent, examples of useful shapes of the shaped abrasive agglomerate particles and shaped abrasive particles include triangular, rectangular, square, pentagonal, and hexagonal prisms.

Figure 3:
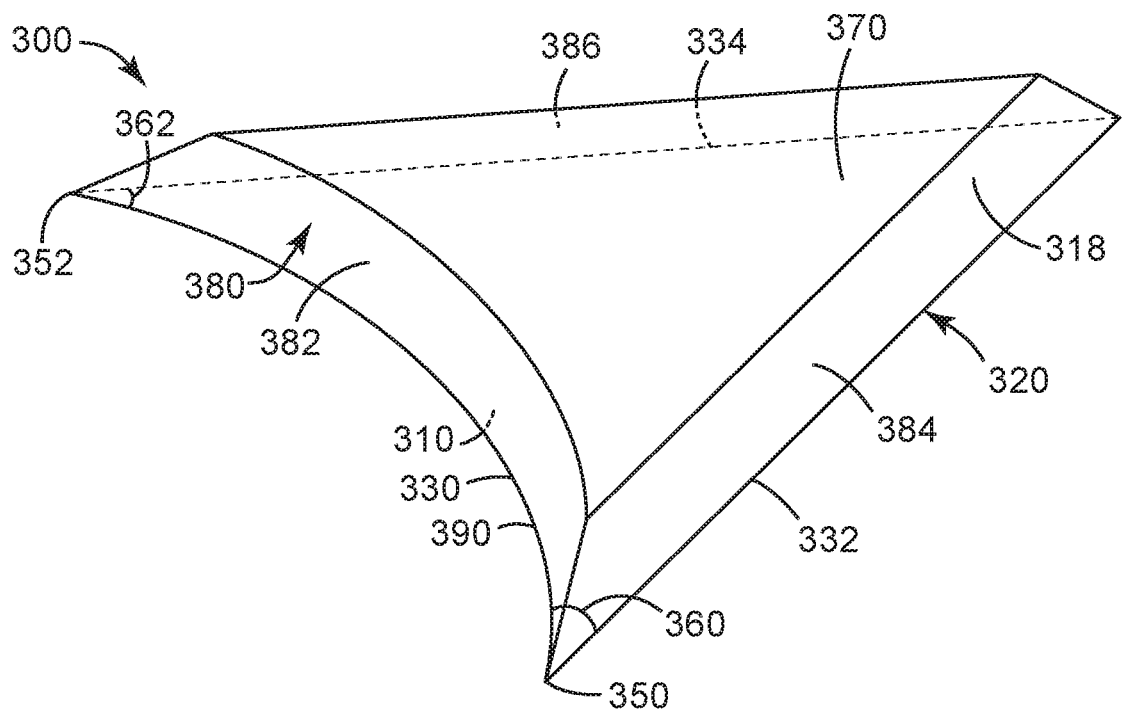
FIG. 3 is a schematic perspective view of an embodiment of a shaped abrasive particle or shaped abrasive agglomerate particle according to the present disclosure.
Figure 4:
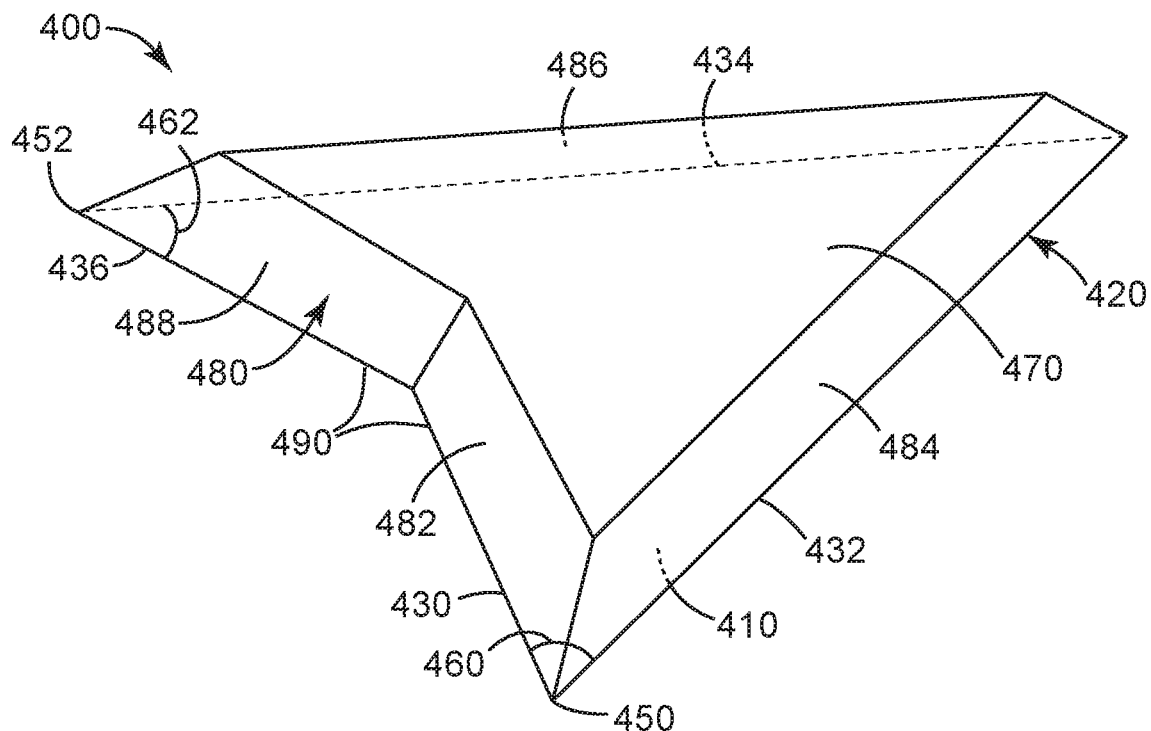
FIG. 4 is a schematic perspective view of another embodiment of a shaped abrasive particle or shaped abrasive agglomerate particle according to the present disclosure.

Other useful shapes for the shaped abrasive agglomerate particles according to the present disclosure and the shaped abrasive particles included in them include shapes other than regular polygons. FIGS. 3 and 4 depict shaped abrasive particles or shaped abrasive agglomerate particles that are generally arrowhead-shaped. Referring now to FIG. 3, a shaped abrasive particle or shaped abrasive agglomerate particle 300 comprises first surface 310 having perimeter 320. Perimeter 320 comprises first, second, and third edges 330, 332, 334. First edge 330 is a concave monotonic curve, while second and third edges 332, 334 are substantially straight edges. Second surface 370 is opposite, and does not contact, first major surface 310. Peripheral surface 380 has a predetermined shape, and is disposed between and connects first and second surfaces 310, 370. Peripheral surface 380 comprises first, second, and third walls 382, 384, 386. First, second, and third edges 330, 332, 334 respectively represent the intersection of first, second, and third walls 382, 384, 386 with perimeter 320. First region 390 of perimeter 320 comprises inwardly extending first edge 330, and terminates at first and second corners 350, 352 defining respective first and second acute interior angles 360, 362.

As shown in FIG. 3, the first region 390 of the perimeter 320 may comprise a single curved inwardly extending edge, however it is also contemplated that the first region 390 of the perimeter 320 may comprise multiple edges (e.g., 2, 3, 4, 5, 6, 7, 8, 9, 10 edges, or more), for example, as shown in FIG. 4.

Referring now to FIG. 4, a shaped abrasive particle or shaped abrasive agglomerate particle 400 comprises first surface 410 having perimeter 420. Perimeter 420 comprises first, second, third, and fourth substantially straight edges 430, 432, 434, 436. Second surface 470 is opposite, and does not contact, first surface 410. Peripheral surface 480 comprises first, second, third, and fourth walls 482, 484, 486, 488. Peripheral surface 480 has a predetermined shape, and is disposed between and connects first and second major surfaces 410, 470. First, second, third, and fourth edges 430, 432, 434, 436 respectively represent the intersection of first, second, third, and fourth walls 482, 484, 486, and 488 with perimeter 420. First region 490 of perimeter 420 comprises first edge 430 and fourth edge 436, and extends inwardly. First region 490 terminates at first and second corners 450, 452 defining respective first and second acute interior angles 460, 462.

In some embodiments, interior angles formed between the inwardly extending first region 390, 490 and either or both adjacent edges of the perimeter are smaller than would be the case if the inwardly extending first region was replaced, for example, by a single straight line segment or a convex edge. For example, in the case of an equilateral triangle, all corners have an interior angle of 60 degrees, while for corresponding shapes having a concave edge replacing one of the triangle's edges, the interior angles of the two corners adjacent to the inwardly extending region may be substantially reduced. For example, in the case of shaped abrasive agglomerate particles or shaped abrasive particles generally having three corners 350, 352, 450, 452, the interior angles 360, 362, 460, 462 may be in a range of from 5, 10, 15, 20, 25, or 30 degrees up to 35, 40, 45, 50, or 55 degrees, or from 40 to 55 degrees. In some embodiments, the interior angles may be in a range of from 35 to 55 degrees, from 40 to 55 degrees, or even from 45 to 55 degrees, although other values are also possible. Similarly, if two (or three) of the triangle's edges are replaced with inwardly extending curved edges, the interior angles of their adjacent corners may fall in the same range or be even lower. The same trend occurs in the case of perimeters having four or more edges, although the interior angle values may tend to be larger.

Figure 5A:
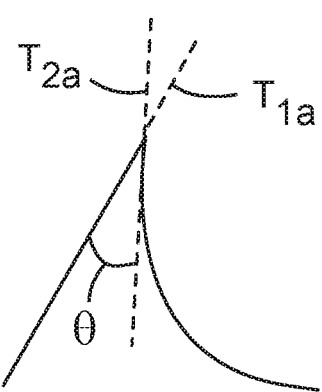
FIGS. 5A and 5B are schematic top views of corners in some embodiments of the shaped abrasive particle or shaped abrasive agglomerate particle according to the present disclosure, showing how to calculate their interior angle if they have a curved surface.
Figure 5B:
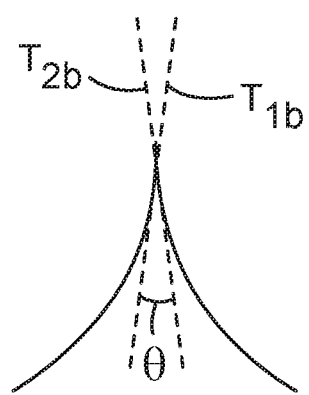

In order to measure the interior angle (θ) of a corner of the perimeter, one takes the angle formed between the tangents ($T_1$, $T_2$) of respective edges forming the corner at their closest point to the corner that has not passed an inflection point with respect to the inwardly extending region. In the case of intersecting straight edges, such tangents have the same slope as the edges themselves and the interior angle can be easily determined. In the case where one or both or the edges are monotonic inwardly extending curves (e.g., as shown in FIGS. 5A and 5B), the tangents ($T_{1a}$ and $T_{2a}$ or $T_{1b}$ and $T_{2b}$), respectively) can likewise be readily determined by approaching the corner along the curved edge(s). However, if the corner is round or otherwise deformed, the measurement of the interior angle of the corner could become more problematic. Accordingly, in such cases, the tangents should be determined by measuring the tangent of each adjacent edge as it approaches the inflection points (if present) proximate to the corner.

In the cases where the shaped abrasive particle or shaped abrasive agglomerate particle have inwardly extending first regions 390, 490, the longest lineal dimension on a surface is usually a straight edge 332, 334, 432, 434. However, if all of the edges are curved as in inwardly extending edge first edge 330 the longest lineal dimension on a surface may be taken as the distance between two corners 350 and 352 where the inwardly facing edges 330 terminate. In other cases of irregularly shaped particles, the longest lineal dimension on a surface may be taken as the furthest distance between two points. In FIGS. 3 and 4, the second face 310, 410 is larger than the first face 370, 470, which may be useful for the reasons described above. In other embodiments, the generally arrowhead shaped particles shown in FIGS. 3 and 4 may have first faces 370, 470 and second faces 310, 410 that are congruent. For more information about shaped abrasive particles with shapes having inwardly facing edges, see U.S. Pat. Appl. No. 2015/0052825 (Adefris).

Figure 6:
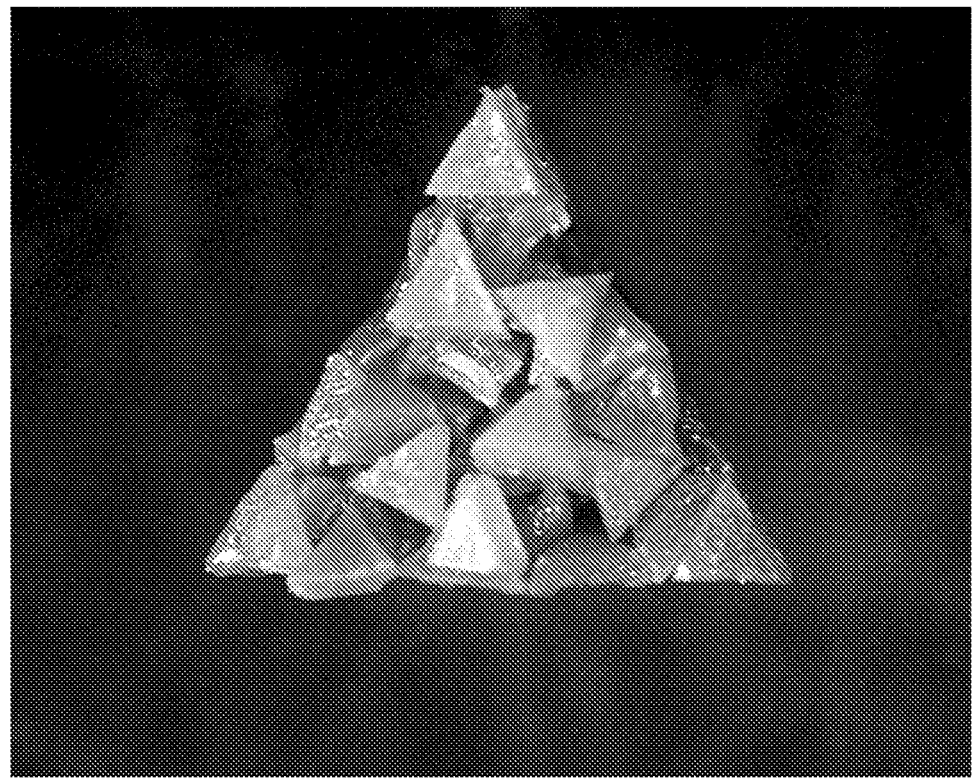
FIG. 6 is a photomicrograph of a shaped abrasive agglomerate particle as described in Example 4.
Figure 7:
FIG. 7 is a photomicrograph of shaped abrasive agglomerate particles as described in Example 5.

In some embodiments, the shaped abrasive agglomerate particles and the shaped abrasive particles have the same shape. That is, both the shaped abrasive agglomerate particles and the shaped abrasive particles can be described as, for example, a triangular frustum, a square frustum, or an arrowhead shape. In other embodiments, the shaped abrasive agglomerate particles and the shaped abrasive particles have different shapes. An embodiment of a shaped abrasive agglomerate particle as described in Example 4, in which both the shaped abrasive agglomerate particle and the shaped abrasive particle contained within it have a triangular frustum shape, is shown in FIG. 6. An embodiment of shaped abrasive agglomerate particles as described in Example 5, in which the shaped abrasive agglomerate particles have a square frustum shape, and the shaped abrasive particles contained within it have a frustum frustrum shape, are shown in FIG. 7. The bottom particle in FIG. 7 shows a face that was open to the air in the mold from which it was made; therefore, the face appears to be nonplanar.

The shaped abrasive particles within the shaped abrasive agglomerate particles may all be the same shape or have different shapes. In some embodiments, at least 50%, 60%, 75%, 80%, 90%, or 95% of the shaped abrasive particles within the shaped abrasive agglomerate particles have the same shape. In some embodiments, the shaped abrasive particles are abrasive shards such as those formed when precursor abrasive particles (described below) fracture within a mold as described in U.S. Pat. No. 8,034,137 (Erickson). In these embodiments, the shaped abrasive particles within the shaped abrasive agglomerate particles would have different shapes.

For shaped abrasive particles within the agglomerates according to the present disclosure that have different shapes, the longest particle lineal dimension is at least twice the shortest particle dimension. Furthermore, in some embodiments, the shaped abrasive particles within the agglomerates have generally similar thicknesses. In some embodiments, at least 50%, 60%, 75%, 80%, 90%, or 95% of the shaped abrasive particles within the shaped abrasive agglomerate particles have thicknesses within 10%, 5%, or 2.5% of an average thickness of the shaped abrasive particles. The thickness of the shaped abrasive particles is the same as the shortest particle dimension.

In the shaped abrasive particles useful in the shaped abrasive agglomerate particles according to the present disclosure, the longest particle lineal dimension on a surface can be up to 1600 micrometers, up to 1000 micrometers, up to 500 micrometers, up to 300 micrometers, or up to 200 micrometers. Useful shaped abrasive particles can have a longest particle lineal dimension on a surface in a range from about one micrometer to 1600 micrometers, one micrometer to 1000 micrometers, one micrometer to 500 micrometers, ten micrometers to 300 micrometers, 15 micrometers to 300 micrometers, or greater than 25 micrometers to 300 micrometers.

Shaped abrasive agglomerate particles according to the present disclosure have a longest agglomerate lineal dimension on a surface of at least 400 micrometers, in some embodiments, at least 500 micrometers, or at least 600 micrometers. In some embodiments, shaped abrasive agglomerate particles according to the present disclosure have a longest agglomerate lineal dimension on a surface of up to 5 millimeters (mm), up to 2 mm, up 1.5 mm, up to 1.4 mm, up to 1.25 mm, up to 1 mm, or up to 0.9 mm. In some embodiments, the agglomerate particles have a longest agglomerate lineal dimension on a surface in a range from about 400 micrometers to 5 mm, 400 micrometers to 2 mm, 400 micrometers to 1000 micrometers, 500 micrometers to 1000 micrometers, 500 micrometers to 900 micrometers, or 600 micrometers to 900 micrometers. Generally, the longest agglomerate lineal dimension on a surface of the shaped abrasive agglomerate particles is at least about 3, 5, or 10 times the longest particle lineal dimension on a surface of the shaped abrasive particles in the agglomerate particles.

Any of the shaped abrasive agglomerate particles according to the present disclosure and the shaped abrasive particles included in them may be sized according to an abrasives industry recognized specified nominal grade. Examples of abrasive industry recognized grading standards include those promulgated by ANSI (American National Standards Institute), FEPA (Federation of European Producers of Abrasives), and JIS (Japanese Industrial Standard). Such industry accepted grading standards include, for example: ANSI 4, ANSI 6, ANSI 8, ANSI 16, ANSI 24, ANSI 30, ANSI 36, ANSI 40, ANSI 50, ANSI 60, ANSI 80, ANSI 100, ANSI 120, ANSI 150, ANSI 180, ANSI 220, ANSI 240, ANSI 280, ANSI 320, ANSI 360, ANSI 400, and ANSI 600; FEPA P8, FEPA P12, FEPA P16, FEPA P24, FEPA P30, FEPA P36, FEPA P40, FEPA P50, FEPA P60, FEPA P80, FEPA P100, FEPA P120, FEPA P150, FEPA P180, FEPA P220, FEPA P320, FEPA P400, FEPA P500, FEPA P600, FEPA P800, FEPA P1000, and FEPA P1200; and JIS 8, JIS 12, JIS 16, JIS 24, JIS 36, JIS 46, JIS 54, JIS 60, JIS 80, JIS 100, JIS 150, JIS 180, JIS 220, JIS 240, JIS 280, JIS 320, JIS 360, JIS 400, JIS 400, JIS 600, JIS 800, JIS 1000, JIS 1500, JIS 2500, JIS 4000, JIS 6000, JIS 8000, and JIS 10,000.

The term "abrasives industry recognized specified nominal grade" also includes abrasives industry recognized specified nominal screened grades. For example, specified nominal screened grades may use U.S.A. Standard Test Sieves conforming to ASTM E-11-09 "Standard Specification for Wire Cloth and Sieves for Testing Purposes." ASTM E-11-

09 sets forth requirements for the design and construction of testing sieves using a medium of woven wire cloth mounted in a frame for the classification of materials according to a designated particle size. A typical designation may be represented as −18+20, meaning that the shaped ceramic abrasive particles pass through a test sieve meeting ASTM E11-09 "Standard Specification for Woven Wire Test Sieve Cloth and Test Sieves" specifications for the number 18 sieve and are retained on a test sieve meeting ASTM E11-09 specifications for the number 20 sieve. In some embodiments, the shaped abrasive particles useful for practicing the present disclosure can have a nominal screened grade comprising: −18+20, −20/+25, −25+30, −30+35, −35+40, 5−40+45, −45+50, −50+60, −60+70, −70/+80, −80+100, −100+120, −120+140, −140+170, −170+200, −200+230, −230+270, −270+325, −325+400, −400+450, −450+500, or −500+635.

In some embodiments, shaped abrasive particles useful in the shaped abrasive agglomerate particles according to the present disclosure comprise ceramic material. In some embodiments, they may consist essentially of ceramic material or even consist of ceramic material, although they may contain non-ceramic phases (e.g., as in a glass-ceramic). Examples of suitable ceramic materials include alpha alumina, fused alumina-zirconia, and fused oxynitrides. Further details concerning sol-gel derived ceramic materials suitable for use in shaped ceramic abrasive particles can be found in, for example, U.S. Pat. No. 4,314,827 (Leitheiser et al.); U.S. Pat. No. 4,518,397 (Leitheiser et al.); U.S. Pat. No. 4,623,364 (Cottringer et al.); U.S. Pat. No. 4,744,802 (Schwabel); U.S. Pat. No. 4,770,671 (Monroe et al.); U.S. Pat. No. 4,881,951 (Wood et al.); U.S. Pat. No. 4,960,441 (Pellow et al.); U.S. Pat. No. 5,139,978 (Wood); U.S. Pat. No. 5,201,916 (Berg et al.); U.S. Pat. No. 5,366,523 (Rowenhorst et al.); U.S. Pat. No. 5,429,647 (Larmie); U.S. Pat. No. 5,547,479 (Conwell et al.); U.S. Pat. No. 5,498,269 (Larmie); U.S. Pat. No. 5,551,963 (Larmie); U.S. Pat. No. 5,725,162 (Garg et al.), and U.S. Pat. No. 6,054,093 (Torre et al.).

A variety of methods may be useful for making the shaped abrasive particles useful in the shaped abrasive agglomerate particles of the present disclosure, for example, molding, extrusion, and die cutting. In some embodiments, shaped abrasive particles can be made according to a multistep process. The process can be carried out using a ceramic precursor dispersion (e.g., a dispersion (e.g., a sol-gel) comprising a ceramic precursor material).

Briefly, the method can comprise the steps of making either a seeded or non-seeded ceramic precursor dispersion that can be converted into a corresponding ceramic (e.g., a boehmite or pseudoboehmite sol-gel that can be converted to alpha alumina); filling one or more mold cavities having the desired outer shape of the shaped abrasive particle with a ceramic precursor dispersion, drying the ceramic precursor dispersion to form shaped ceramic precursor particles; removing the shaped ceramic precursor particles from the mold cavities; calcining the shaped ceramic precursor particles to form calcined, shaped ceramic precursor particles, and then sintering the calcined, shaped ceramic precursor particles to form shaped ceramic abrasive particles. In some embodiments, the calcining step is omitted and the shaped ceramic precursor particles are sintered directly after removal from the mold. In some embodiments, the mold may be made of a sacrificial material (e.g., a polyolefin material) that is burned off during calcining or sintering, thereby eliminating the step separating the ceramic precursor particles from it during processing.

The method of making a shaped abrasive particle can include providing either a seeded or non-seeded dispersion of a ceramic precursor material (i.e., a ceramic precursor dispersion) that can be converted into a ceramic material. The ceramic precursor dispersion often comprises a volatile liquid component. In some embodiments, the volatile liquid component is water. The ceramic precursor dispersion should comprise a sufficient amount of liquid for the viscosity of the dispersion to be low enough to enable filling mold cavities and replicating the mold surfaces, but not so much liquid as to cause subsequent removal of the liquid from the mold cavity to be prohibitively expensive. In one embodiment, the ceramic precursor dispersion comprises from 2 to 90 percent by weight of the particles that can be converted into ceramic, such as particles of aluminum oxide monohydrate (boehmite) or another alumina precursor, and at least 10 to 98 percent by weight, or from 50 to 70 percent by weight, or 50 to 60 percent by weight, of the volatile component such as water. Conversely, the ceramic precursor dispersion in some embodiments contains from 30 to 50 percent, or 40 to 50 percent by weight solids.

Examples of useful ceramic precursor dispersions include zirconium oxide sols, vanadium oxide sols, cerium oxide sols, aluminum oxide sols, and combinations thereof. Useful aluminum oxide dispersions include, for example, boehmite dispersions, pseudoboehmite dispersions, and other aluminum oxide hydrates dispersions. Boehmite and pseudoboehmite can be prepared by known techniques or can be obtained commercially. Examples of commercially available boehmite and pseudoboehmite include products having the trade designations "HIQ-40" available from BASF Corporation, and "DISPERAL", and "DISPAL", both available from Sasol North America, Inc. These aluminum oxide monohydrates are relatively pure; that is, they include relatively little, if any, hydrate phases other than monohydrates, and have a high surface area. Further information about ceramic precursor dispersions, including modifying additives, nucleating agents, peptizing agents, defoamers, and other additives can be found, for example, in U.S. Pat. Appl. Pub. No. 2015/0052825 (Adefris).

The physical properties of the resulting shaped ceramic abrasive particles will generally depend upon the type of material used in the ceramic precursor dispersion. As used herein, a "gel" is a three dimensional network of solids dispersed in a liquid.

Molding the shaped abrasive particles can be carried out using similar molds and methods as molding the shaped abrasive agglomerate particles, described below.

The shaped ceramic precursor particles can be dried or calcined after being removed from the mold. If the ceramic precursor dispersion is dried to the desired level in the mold, an additional drying step is not necessary. However, in some instances it may be economical to employ an additional drying step to minimize the time that the ceramic precursor dispersion resides in the mold. Typically, the shaped ceramic precursor particles will be dried from 10 to 480 minutes, or from 120 to 400 minutes, at a temperature from 50° C. to 160° C., or at 120° C. to 150° C. During the optional calcining, essentially all the volatile material is removed, and the various components that were present in the ceramic precursor dispersion are transformed into metal oxides. The shaped ceramic precursor particles are generally heated to a temperature from 400° C. to 800° C., and maintained within this temperature range until the free water and over 90 percent by weight of any bound volatile material are removed. In an optional step, it may be desired to introduce the modifying additive by an impregnation process. A watersoluble salt can be introduced by impregnation into the pores of the calcined, shaped ceramic precursor particles. Then the shaped ceramic precursor particles are pre-fired again. This option is further described in U.S. Pat. No. 5,164,348 (Wood).

Sintering the shaped ceramic precursor particles to form ceramic particles is typically necessary to achieve the desired hardness for useful shaped ceramic abrasive particles. Sintering takes place by heating the shaped ceramic precursor particles to a temperature of from 1000° C. to 1650° C. The length of time to which the calcined, shaped ceramic precursor particles must be exposed to the sintering temperature to achieve this level of conversion depends upon various factors but usually from five seconds to 48 hours is typical. In some embodiments, the duration for the sintering step ranges from one minute to 90 minutes. After sintering, the shaped ceramic abrasive particles can have a Vickers hardness of 10 GPa (gigapascals), 16 GPa, 18 GPa, 20 GPa, or greater.

Other steps can be used to modify the described process such as, for example, rapidly heating the material from the calcining temperature to the sintering temperature, centrifuging the ceramic precursor dispersion to remove sludge and/or waste. Moreover, the process can be modified by combining two or more of the process steps if desired. Conventional process steps that can be used to modify the process of this disclosure are more fully described in U.S. Pat. No. 4,314,827 (Leitheiser).

Shaped ceramic abrasive particles composed of crystallites of alpha alumina, magnesium alumina spinel, and a rare earth hexagonal aluminate may be prepared using sol-gel alpha alumina precursor particles according to methods described in, for example, U.S. Pat. No. 5,213,591 (Celikkaya et al.). Alpha alumina abrasive particles may contain zirconia as disclosed in U.S. Pat. No. 5,551,963 (Larmie). Alternatively, alpha alumina abrasive particles may have a microstructure or additives, for example, as disclosed in U.S. Pat. No. 6,277,161 (Castro). More information concerning methods to make shaped ceramic abrasive particles is disclosed in U.S. Pat. No. 8,123,828 (Culler et al.) and U.S. Pat. No. 8,034,137 (Erickson), which describe conditions, for example, for making abrasive shards.

Shaped agglomerate particles according to the present disclosure include a vitreous matrix. The vitreous matrix can be a glass or a glass-ceramic. Various types of glass and glass-ceramics may be useful to make the vitreous matrix. The glass frit used in the examples, below, provides such a vitreous matrix.

The vitreous matrix may be produced from a precursor composition comprising a mixture or combination of one or more raw materials that when heated to a high temperature melt and/or fuse to form an integral vitreous matrix phase. The vitreous matrix may be formed, for example, from a frit. A frit is a composition that has been pre-fired before its employment in a vitreous bond precursor composition for forming the vitreous matrix of the shaped abrasive agglomerate particle. As used herein, the term "frit" is a generic term for a material that is formed by thoroughly blending a mixture comprising one or more frit forming components, followed by heating (also referred to as pre-firing) the mixture to a temperature at least high enough to melt it; cooling the resulting glass, and crushing it. The crushed material can then be screened to a very fine powder.

Examples of suitable glasses for the vitreous matrix and the frit for making it include silica glass, silicate glass, borosilicate glass, and combinations thereof. A silica glass is typically composed of 100 percent by weight of silica. In some embodiments, the vitreous matrix is a glass that include metal oxides or oxides of metalloids, for example, aluminum oxide, silicon oxide, boron oxide, magnesium oxide, sodium oxide, manganese oxide, zinc oxide, calcium oxide, barium oxide, lithium oxide, potassium oxide, titanium oxide, metal oxides that can be characterized as pigments (e.g., cobalt oxide, chromium oxide, and iron oxide), and mixtures thereof.

Examples of suitable ranges for the vitreous matrix, vitreous matrix precursor compositions, and/or frit include 25 to 90% be weight, optionally 35 to 85% by weight, based on the total weight of the vitreous material, of $SiO_2$; 0 to 40% by weight, optionally 0 to 30% by weight, based on the total weight of the vitreous material, of $B_2O_3$; 0 to 40% by weight, optionally 5 to 30% by weight, based on the total weight of the vitreous material, of $Al_2O_3$; 0 to 5% by weight, optionally 0 to 3% by weight, based on the total weight of the vitreous material, of $Fe_2O_3$; 0 to 5% by weight, optionally 0 to 3% by weight, based on the total weight of the vitreous material, of $TiO_2$; 0 to 20% by weight, optionally 0 to 10% by weight, based on the total weight of the vitreous material, of CaO; 0 to 20% by weight, optionally 1 to 10% by weight, based on the total weight of the vitreous material, of MgO; 0 to 20% by weight, optionally 0 to 10% by weight, based on the total weight of the vitreous material, of $K_2O$; 0 to 25% by weight, optionally 0 to 15% by weight, based on the total weight of the vitreous material, of $Na_2O$; 0 to 20% by weight, optionally 0 to 12% by weight, based on the total weight of the vitreous material, of $Li_2O$; 0 to 10% by weight, optionally 0 to 3% by weight, based on the total weight of the vitreous material, of ZnO; 0 to 10% by weight, optionally 0 to 3% by weight, based on the total weight of the vitreous material, of BaO; and 0 to 5% by weight, optionally 0 to 3% by weight, based on the total weight of the vitreous material, of metallic oxides (e.g., CoO, $Cr_2O_3$ or other pigments).

An example of a suitable silicate glass composition comprises about 70 to about 80 percent by weight of silica, about 10 to about 20 percent sodium oxide, about 5 to about 10 percent calcium oxide, about 0.5 to about 1 percent aluminum oxide, about 2 to about 5 percent magnesium oxide, and about 0.5 to about 1 percent potassium oxide, based on the total weight of the glass frit. Another example of a suitable silicate glass composition includes about 73 percent by weight of silica, about 16 percent by weight of sodium oxide, about 5 percent by weight of calcium oxide, about 1 percent by weight of aluminum oxide, about 4 percent by weight of magnesium oxide, and about 1 percent by weight of potassium oxide, based on the total weight of the glass frit. In some embodiments, the glass matrix comprises an alumina-borosilicate glass comprising $SiO_2$, $B_2O_3$, and $Al_2O_3$. An example of a suitable borosilicate glass composition comprises about 50 to about 80 percent by weight of silica, about 10 to about 30 percent by weight of boron oxide, about 1 to about 2 percent by weight of aluminum oxide, about 0 to about 10 percent by weight of magnesium oxide, about 0 to about 3 percent by weight of zinc oxide, about 0 to about 2 percent by weight of calcium oxide, about 1 to about 5 percent by weight of sodium oxide, about 0 to about 2 percent by weight of potassium oxide, and about 0 to about 2 percent by weight of lithium oxide, based on the total weight of the glass frit. Another example of a suitable borosilicate glass composition includes about 52 percent by weight of silica, about 27 percent by weight of boron oxide, about 9 percent by weight of aluminum oxide, about 8 percent by weight of magnesium oxide, about 2 percent by weight of zinc oxide, about 1 percent by weight of calcium oxide, about 1 percent by weight of sodium oxide, about 1 percent by weight of potassium oxide, and about 1 percent by weight of lithium oxide, based on the total weight of the glass frit. Other examples suitable borosilicate glass composition include, based upon weight, 47.61% $SiO_2$, 16.65% $Al_2O_3$, 0.38% $Fe_2O_3$, 0.35% $TiO_2$, 1.58% CaO, 0.10% MgO, 9.63% $Na_2O$, 2.86% $K_2O$, 1.77% $Li_2O$, 19.03% $B_2O_3$, 0.02% $MnO_2$, and 0.22% $P_2O_5$; and 63% $SiO_2$, 12% $Al_2O_3$, 1.2% CaO, 6.3% $Na_2O$, 7.5% $K_2O$, and 10% $B_2O_3$. In some embodiments, a useful alumina-borosilicate glass composition comprises, by weight, about 18% $B_2O_3$, 8.5% $Al_2O_3$, 2.8% BaO, 1.1% CaO, 2.1% $Na_2O$, 1.0% $Li_2O$, with the balance being $SiO_2$. Such an alumina-borosilicate glass is commercially available from Specialty Glass Incorporated, Oldsmar, Fla.

Glass frit for making glass-ceramics may be selected from the group consisting of magnesium aluminosilicate, lithium aluminosilicate, zinc aluminosilicate, calcium aluminosilicate, and combinations thereof. Known crystalline ceramic phases that can form glasses within the above listed systems include: cordierite ($2MgO.2Al_2O_3.5SiO_2$), gehlenite ($2CaO.Al_2O_3.SiO_2$), anorthite ($2CaO.Al_2O_3.2SiO_2$), hardy stonite ($2CaO.ZnO.2SiO_2$), akeranite ($2CaO.MgO.2SiO_2$), spodumene ($2Li_2O.Al_2O_3.4SiO_2$), willemite ($2ZnO.SiO_2$), and gahnite ($ZnO.Al_2O_3$). Glass frit for making glass-ceramic may comprise nucleating agents. Nucleating agents are known to facilitate the formation of crystalline ceramic phases in glass-ceramics. As a result of specific processing techniques, glassy materials do not have the long range order that crystalline ceramics have. Glass-ceramics are the result of controlled heat-treatment to produce, in some cases, over 90% crystalline phase or phases with the remaining non-crystalline phase filling the grain boundaries. Glass ceramics combine the advantage of both ceramics and glasses and offer durable mechanical and physical properties.

Frit useful for forming the vitreous matrix may also contain frit binders (e.g, feldspar, borax, quartz, soda ash, zinc oxide, whiting, antimony trioxide, titanium dioxide, sodium silicofluoride, flint, cryolite, boric acid, and combinations thereof) and other minerals (e.g., clay, kaolin, wollastonite, limestone, dolomite, chalk, and combinations thereof).

The vitreous matrix in the agglomerate particles according to the present disclosure may be selected, for example, based on a desired coefficient of thermal expansion (CTE). In some embodiments, it is useful for the vitreous matrix and the shaped abrasive particles to have similar CTEs, for example, ±100%, 50%, 40%, 25%, or 20% of each other. The CTE of fused alumina is typically about $8 \times 10^{-6}$/Kelvin (K). A vitreous matrix may be selected to have a CTE in a range from $4 \times 10^{-6}$/K to $16 \times 10^{-6}$/K. The glass frit V601 used in the examples, below, is believed to have a CTE of about $7.7 \times 10^{-6}$/K. Examples of a glass frit for making a suitable vitreous matrix include those used in the Examples, below, and a glass frit commercially available, for example, from, Fusion Ceramics, Carrollton, Ohio, under the trade designation "F245".

The shaped abrasive agglomerate particles comprise about 70 percent to 95 percent by weight of the shaped abrasive particles and 30 percent to 5 percent by weight vitreous matrix, based on the total weight of the shaped abrasive agglomerate particles. In some embodiments, the shaped abrasive agglomerate particles comprise about 70 percent to 85 percent by weight shaped abrasive particles and 30 percent to 15 percent by weight vitreous matrix, based on the total weight of the shaped abrasive agglomerate particles. In some embodiments, the shaped abrasive agglomerate particles comprise about 70 percent to 80 percent by weight of the shaped abrasive particles and 30 percent to 20 percent by weight vitreous matrix, based on the total weight of the agglomerate particles. In the shaped abrasive agglomerate particles according to the present disclosure, the amount of vitreous matrix is relatively small (e.g., up to 30, 20, 15, or 5 percent), which can be useful to facilitate the desired erosion of the shaped abrasive agglomerate particle, for example, in a coated belt used in centerless grinding applications.

The agglomerate particles may further contain other additives such as fillers, grinding aids, pigments (e.g., metal oxide pigments), adhesion promoters, crushed abrasive particles, and other processing materials. Examples of fillers include small glass bubbles, solid glass spheres, alumina, zirconia, titania, and metal oxide fillers, which can improve the erodibility of the agglomerates. Examples of grinding aids include waxes, organic halide compounds, halide salts, and metals and their alloys. The organic halide compounds will typically break down during abrading and release a halogen acid or a gaseous halide compound. Examples of such materials include chlorinated waxes like tetrachloronaphthalene, pentachloronaphthalene; and polyvinyl chloride. Examples of halide salts include sodium chloride, potassium cryolite, sodium cryolite, ammonium cryolite, potassium tetrafluoroborate, sodium tetrafluoroborate, silicon fluorides, potassium chloride, and magnesium chloride. Examples of other grinding aids include sulfur, organic sulfur compounds, graphite, and metallic sulfides. A combination of different grinding aids can be used. Examples of pigments include iron oxide, titanium dioxide, and carbon black. Examples of processing materials, i.e., processing aids, include liquids and temporary organic binder precursors. The liquids can be water, an organic solvent, or combinations thereof. Examples of organic solvents include alkanes, alcohols such as isopropanol, ketones such as methylethyl ketone, esters, and ethers.

A variety of methods may be useful for making the shaped abrasive agglomerate particles according to the present disclosure, for example, molding, extrusion, and die cutting. One method for making the shaped abrasive agglomerate particles comprises, for example, mixing starting materials comprising a vitreous matrix precursor (e.g., glass frit), shaped abrasive particles, and a temporary organic binder. In some embodiments, the temporary organic binder can undergo physical change (e.g., melting or softening, following by solidification and hardening) or chemical change (e.g., crosslinking or forming chemical bonds during curing) to bind together the shaped abrasive agglomerate particles. Suitable temporary organic binders include dextrins (e.g., potato starch), polysaccharides, polyethylene glycol, polyacrylates, an adhesive, an organic resin (e.g., urea/formaldehyde resin or any of those described below for coated abrasive articles), a wax, or a combination thereof. The temporary organic binder permits the mixture to be more easily shaped and to retain this shape during further processing. In some embodiments, the temporary organic binder comprises at least one of dextrin and methylcellulose.

Optionally, other additives and processing aids, as described above, e.g., inorganic fillers, grinding aids, and/or a liquid medium (e.g., water or organic solvent as described above) may be used in the preparation of the shaped agglomerate particles. The starting materials can be mixed together by any conventional technique which results in a uniform mixture. For example, the shaped abrasive particles can be mixed with a temporary organic binder in a mechanical mixing device such as a planetary mixer. The vitreous matrix precursor (e.g., glass frit) can then be added to the resulting mixture and blended until a uniform mixture is achieved, typically 10 to 30 minutes.

In some embodiments, the starting materials are mixed in a liquid medium (e.g., water or organic solvent) to make a slurry. Some inorganic fillers such as fumed silica fillers can be useful, for example, as rheology modifiers.

The mixture including vitreous matrix precursor, shaped abrasive particles, and temporary organic binder can then be shaped and processed to form agglomerate precursors. The mixture may be shaped, for example, by molding, extrusion, and die cutting. There will typically be some shrinkage associated with the loss of the temporary organic binder, and this shrinkage may be taken into account when determining the initial shape and size. The shaping process can be done on a batch process or in a continuous manner. In some embodiments, shaping the agglomerate is carried out by placing the starting materials, which have been combined and formed into a uniform mixture, into a mold having the inverse shape of the shaped abrasive agglomerate particles. In some embodiments, the mold is formed as a production tool, which can be, for example, a belt, a sheet, a continuous web, a coating roll such as a rotogravure roll, a sleeve mounted on a coating roll, or a die.

The mold can be any mold which allows for release of the particles. In some embodiments, the mold comprises polymeric material. Examples of suitable polymeric materials include thermoplastics such as polyesters, polycarbonates, poly(ether sulfone), poly(methyl methacrylate), polyurethanes, polyvinylchloride, polyolefin, polystyrene, polypropylene, polyethylene or combinations thereof, silicones, or thermosetting materials. In some embodiments, the entire mold is made from a polymeric material. In other embodiments, the surfaces of the mold in contact with the ceramic precursor dispersion while drying, such as the surfaces of the plurality of cavities, comprises polymeric materials and other portions of the mold can be made from other materials. A suitable polymeric coating may be applied to a metal mold to change its surface tension properties, for example A mold release can be used to aid in removing the particles from the mold if desired. Typical mold release agents include oils such as peanut oil or mineral oil, fish oil, silicones, polytetrafluoroethylene, zinc stearate, and graphite. In general, mold release agent such as peanut oil, in a liquid, such as water or alcohol, is applied to the surfaces of the production tooling in contact with the ceramic precursor dispersion such that between about 0.1 mg/in$^2$ (0.02 mg/cm$^2$) to about 3.0 mg/in$^2$ (0.5 mg/cm$^2$), or between about 0.1 mg/in$^2$ (0.02 mg/cm$^2$) to about 5.0 mg/in$^2$ (0.8 mg/cm$^2$) of the mold release agent is present per unit area of the mold when a mold release is desired.

Access to cavities can be from an opening in the top surface or bottom surface of the mold. In some instances, the cavities can extend for the entire thickness of the mold. Alternatively, the cavities can extend only for a portion of the thickness of the mold. In one embodiment, the top surface is substantially parallel to bottom surface of the mold with the cavities having a substantially uniform depth. At least one edge of the mold, that is, the edge in which the cavities are formed, can remain exposed to the surrounding atmosphere during the step in which the volatile component is removed.

The cavities have a specified three-dimensional shape to make the shaped abrasive particles and shaped abrasive agglomerate particles. The depth dimension is equal to the perpendicular distance from the top surface to the lowermost point on the bottom surface. The depth of a given cavity can be uniform or can vary along its length and/or width. The cavities of a given mold can be of the same shape or of different shapes.

The mixture including the vitreous matrix precursor, temporary organic binder, and shaped abrasive particles can be introduced into the mold cavities by a conventional technique. In some embodiments, a knife roll coater or vacuum slot die coater can be used. A scraper or leveler bar can be used to force the mixture fully into the cavity of the mold. The remaining portion of the mixture that does not enter cavity can be removed from top surface of the mold and recycled. In some embodiments, a small portion of the mixture can remain on the top surface and in other embodiments the top surface can be substantially free of the mixture.

The mold, containing the mixture, can then be placed in an oven and heated to least partially remove any liquid (e.g., in a slurry) or otherwise harden the temporary binder (e.g., by curing). The temperature depends on the temporary organic binder used and is typically between 35 to 200° C., in some embodiments, 70 to 150° C. The at least partially dried mixture is then removed from the mold. It is also possible to destroy (e.g., completely burn off) the mold to release the agglomerates. The mixture can also be irradiated (e.g., with UV light, IR light, or another energy source) to harden (in some embodiments, cure) the temporary binder.

The agglomerate precursors are then heated to burn off the organic materials used to prepare the agglomerate precursors, for example, the temporary organic binder, and to melt or vitrify the vitreous binder, which may occur separately or as one continuous step, accommodating any necessary temperature changes. The temperature to burn off the organic materials may be selected to control the porosity in the shaped abrasive agglomerate particles. The selected temperature can depend on the chemistry of the temporary organic binder and other optional ingredients. Typically, the temperature for burning off organic materials ranges from about 50 to 600° C., in some embodiments, from 75 to 500° C., although higher temperatures are also possible. The temperature for melting or vitrifying the vitreous binder typically ranges between 650 to 1150° C., in some embodiments, between 650 to 950° C.

The shaped abrasive agglomerate particles may contain a coating of inorganic particles which may be useful for minimizing the aggregation of the shaped abrasive agglomerate particles with one another during their manufacture. However, the coating is not considered part of the shaped abrasive agglomerate particles since they are not incorporated within or bonded in the matrix.

Examples of inorganic particles suitable for coating the shaped abrasive agglomerate particles according to the present disclosure include fillers and abrasive grains, for example, metal carbonates, silica, silicates, metal sulfates, metal carbides, metal nitrides, metal borides, gypsum, metal oxides, graphite, and metal sulfites. The inorganic particles may comprise fused alumina. In some embodiments, the inorganic particles have a size ranging from about 10 to 500, in some embodiments 25 to 250, micrometers. A coating of inorganic particles can be made by mixing the shaped abrasive agglomerate particles after they are shaped (e.g., removed from the mold) with the inorganic particles. A small amount of at least one of water, solvent, or temporary organic binder precursor, for example, in an amount ranging from 5 to 15 weight %, or from 6 to 12 weight %, based on the weight of the agglomerate precursor, may also be added to aid in securing the inorganic particles to the surface of the agglomerate precursor.

The resulting agglomerates can then be thermally processed to optimize bond properties. The thermal processing comprises heating at a temperature ranging from 300 to 900° C., in some embodiments, 350 to 800° C. or 400 to 700° C.

The shaped abrasive agglomerate particles may be porous or nonporous. Porosity can influence the erosion of the agglomerate particles during an abrading process by facilitating the release of used shaped abrasive particles. As described above, porosity in the agglomerates can arise from the temporary organic binder. Engineered porosity can also be generated through the use of fillers. For example, glass bubbles can be included with the glass frit to incorporate pores into the vitreous matrix. Other fillers that may be useful for forming pores include cork, crushed shells, or polymeric materials. As used herein, the term "engineered porosity" refers to porosity that is incorporated into the shaped abrasive agglomerate particles by design through the use of fillers or other pore forming agents. Engineered porosity would not include, for example, porosity that would inherently occur during the formation of the vitreous matrix. In some embodiments, the shaped abrasive agglomerate particles include about zero percent to about 60 percent pores by volume, in some cases about zero percent to about 25 percent pores by volume, as observed by Scanning Electron Microscopy.

Shaped abrasive agglomerate particles according to the present disclosure may be useful, for example, in coated abrasives, nonwoven abrasives, abrasive brushes, and bonded abrasives. Coated abrasives can comprise a plurality of the shaped abrasive agglomerate particles bonded to a backing. Nonwoven abrasives can comprise a plurality of the shaped abrasive agglomerate particles bonded onto and into a lofty, porous, nonwoven substrate. In general, abrasive articles comprise a plurality of shaped abrasive agglomerate particles retained in a binder. Binder materials for coated and nonwoven abrasives they are typically organic binders.

In some embodiments, the plurality of the shaped abrasive agglomerate particles according to the present disclosure in an abrasive article have the same shape. In some embodiments, at least 50%, 60%, 75%, 80%, 90%, or 95% of the shaped abrasive agglomerate particles within the abrasive article have the same shape. Furthermore, in some embodiments, the shaped abrasive agglomerate particles within the abrasive article have generally similar thicknesses. In some embodiments, at least 50%, 60%, 75%, 80%, 90%, or 95% of the shaped abrasive agglomerate particles within the abrasive article have thicknesses within 10%, 5%, or 2.5% of an average thickness of the shaped abrasive agglomerate particles. The thickness is the shortest agglomerate dimension in the agglomerates according to the present disclosure.

Figure 8:
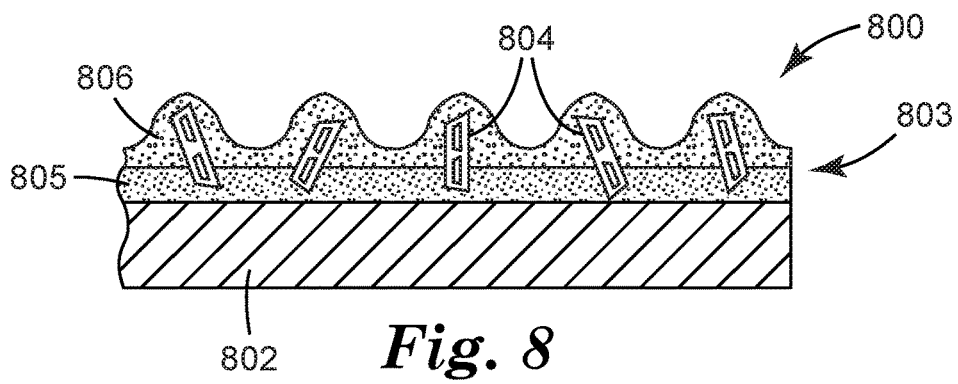
FIG. 8 is a cross-sectional edge view of an embodiment of a coated abrasive article according to the present disclosure.

An embodiment of a coated abrasive including agglomerate particles according to the present disclosure is shown in FIG. 8. In the embodiment illustrated in FIG. 8, a coated abrasive article 800 comprises a backing 802 and abrasive layer 803. Abrasive layer 803 includes shaped abrasive agglomerate particles 804 secured to a major surface of backing 802 by make layer 805 and size layer 806. In some instances, a supersize coat (not shown) is used.

A variety of backings 802 are suitable for coated abrasive articles according to the present disclosure. Examples of suitable backings 802 include polymeric film, primed polymeric film, greige cloth, cloth, paper, vulcanized fiber, nonwovens, treated versions of these, and combinations thereof. The backing 802 may comprise optional additives, for example, fillers, fibers, antistatic agents, lubricants, wetting agents, surfactants, pigments, dyes, coupling agents, plasticizers, and suspending agents. The amounts of these optional materials depend on the properties desired. The backing may be selected such that it has sufficient strength and heat resistance to withstand its process and use conditions under abrading. Additionally, if the abrasive article is intended to be used in a wet or lubricating environment, the backing may be selected such that it has sufficient water and/or oil resistance, obtaining by treating the backing with a thermosetting resin so that it does not degrade during abrading. Useful resins include phenolic resins, which can optionally be modified with rubber; epoxy resins, which can optionally be modified with a fluorene compound; and bismaleimide resins.

In a coated abrasive, the make coat 805 and size coat 806 may collectively be referred to as a binder, and they may be made from the same or different binder precursors. During manufacture of a coated abrasive article, a binder precursor is exposed to an energy source which aids in the initiation of the polymerization or curing of the binder precursor. Examples of energy sources include thermal energy and radiation energy (e.g., electron beam, ultraviolet light, and visible light). During this polymerization process, the binder precursor is polymerized or cured and is converted into a solidified binder.

The binder can be formed of a curable (e.g., via energy such as UV light or heat) organic material. Examples include amino resins, alkylated urea-formaldehyde resins, melamine-formaldehyde resins, and alkylated benzoguanamine-formaldehyde resin, acrylate resins (including acrylates and methacrylates) such as vinyl acrylates, acrylated epoxies, acrylated urethanes, acrylated polyesters, acrylated acrylics, acrylated polyethers, vinyl ethers, acrylated oils, and acrylated silicones, alkyd resins such as urethane alkyd resins, polyester resins, reactive urethane resins, phenolic resins such as resole and novolac resins, phenolic/latex resins, epoxy resins such as bisphenol epoxy resins, isocyanates, isocyanurates, poly siloxane resins (including alkylalkoxysilane resins), reactive vinyl resins, and phenolic resins (resole and novolac). The resins may be provided as monomers, oligomers, polymers, or combinations thereof.

The binder precursor can be a condensation curable resin, an addition polymerizable resin, a free-radical curable resin, and/or combinations and blends of such resins. One binder precursor is a resin or resin mixture that polymerizes via a free-radical mechanism. The polymerization process is initiated by exposing the binder precursor, along with an appropriate catalyst, to an energy source such as thermal energy or radiation energy. Examples of radiation energy include electron beam, ultraviolet light, or visible light.

Examples of suitable binder precursors include phenolic resins, urea-formaldehyde resins, aminoplast resins, urethane resins, melamine formaldehyde resins, cyanate resins, isocyanurate resins, (meth)acrylate resins (e.g., (meth)acrylated urethanes, (meth)acrylated epoxies, ethylenically-unsaturated free-radically polymerizable compounds, aminoplast derivatives having pendant alpha, beta-unsaturated carbonyl groups, isocyanurate derivatives having at least one pendant acrylate group, and isocyanate derivatives having at least one pendant acrylate group) vinyl ethers, epoxy resins, and mixtures and combinations thereof. As used herein, the term "(meth)acryl" encompasses acryl and methacryl. Ethylenically-unsaturated monomers or oligomers, or (meth)acrylate monomers or oligomers, may be monofunctional, difunctional, trifunctional or tetrafunctional, or even higher functionality.

Phenolic resins have good thermal properties, availability, and relatively low cost and ease of handling There are two types of phenolic resins, resole and novolac. Resole phenolic resins have a molar ratio of formaldehyde to phenol of greater than or equal to one to one, typically in a range of from 1.5:1.0 to 3.0:1.0. Novolac resins have a molar ratio of formaldehyde to phenol of less than one to one. Examples of commercially available phenolic resins include those known by the trade designations DUREZ and VARCUM from Occidental Chemicals Corp., Dallas, Tex.; RESINOX from Monsanto Co., Saint Louis, Mo.; and AEROFENE and AROTAP from Ashland Specialty Chemical Co., Dublin, Ohio.

(Meth)acrylated urethanes include di(meth)acrylate esters of hydroxyl-terminated NCO extended polyesters or polyethers. Examples of commercially available acrylated urethanes include those available as CMD 6600, CMD 8400, and CMD 8805 from Cytec Industries, West Paterson, N.J.

(Meth)acrylated epoxies include di(meth)acrylate esters of epoxy resins such as the diacrylate esters of bisphenol A epoxy resin. Examples of commercially available acrylated epoxies include those available as CMD 3500, CMD 3600, and CMD 3700 from Cytec Industries.

Ethylenically-unsaturated free-radically polymerizable compounds include both monomeric and polymeric compounds that contain atoms of carbon, hydrogen, and oxygen, and optionally, nitrogen and the halogens. Oxygen or nitrogen atoms or both are generally present in ether, ester, urethane, amide, and urea groups. Ethylenically-unsaturated free-radically polymerizable compounds typically have a molecular weight of less than about 4,000 g/mole and are typically esters made from the reaction of compounds containing a single aliphatic hydroxyl group or multiple aliphatic hydroxyl groups and unsaturated carboxylic acids, such as acrylic acid, methacrylic acid, itaconic acid, crotonic acid, isocrotonic acid, maleic acid, and the like. Representative examples of (meth)acrylate resins include methyl methacrylate, ethyl methacrylate styrene, divinylbenzene, vinyl toluene, ethylene glycol diacrylate, ethylene glycol methacrylate, hexanediol diacrylate, triethylene glycol diacrylate, trimethylolpropane triacrylate, glycerol triacrylate, pentaerythritol triacrylate, pentaerythritol methacrylate, pentaerythritol tetraacrylate and pentaerythritol tetraacrylate. Other ethylenically-unsaturated resins include monoallyl, polyallyl, and polymethallyl esters and amides of carboxylic acids, such as diallyl phthalate, diallyl adipate, and N,N-diallyladipamide. Still other ethylenically-unsaturated compounds are nitrogen-containing compounds such as tris (2-acryloyl-oxyethyl) isocyanurate, 1,3,5-tris(2-methyacryloxyethyl)-s-triazine, acrylamide, N-methylacrylamide, N,N-dimethylacrylamide, N-vinylpyrrolidone, and N-vinylpiperidone.

Useful aminoplast resins have at least one pendant alpha, beta-unsaturated carbonyl group per molecule or oligomer. These unsaturated carbonyl groups can be acrylate, methacrylate, or acrylamide type groups. Examples of such materials include N-(hydroxymethyl)acrylamide, N,N'-oxydimethylenebisacrylamide, ortho- and para-acrylamidomethylated phenol, acrylamidomethylated phenolic novolac, and combinations thereof. These materials are further described in U.S. Pat. Nos. 4,903,440 and 5,236,472 (both to Kirk et al.).

Isocyanate derivatives having at least one pendant acrylate group are further described in U.S. Pat. No. 4,652,274 (Boettcher et al.). An example of one isocyanurate material is the triacrylate of tris(hydroxyethyl) isocyanurate.

Epoxy resins have one or more epoxy groups that may be polymerized by ring opening of the epoxy group(s). Such epoxy resins include monomeric epoxy resins and oligomeric epoxy resins. Examples of useful epoxy resins include 2,2-bis[4-(2,3-epoxypropoxy)-phenyl propane] (diglycidyl ether of bisphenol) and materials available as EPON 828, EPON 1004, and EPON 1001F from Momentive Specialty Chemicals, Columbus, Ohio; and DER-331, DER-332, and DER-334 from Dow Chemical Co., Midland, Mich. Other suitable epoxy resins include glycidyl ethers of phenol formaldehyde novolac commercially available as DEN-431 and DEN-428 from Dow Chemical Co.

The epoxy resins can polymerize via a cationic mechanism with the addition of an appropriate cationic curing agent. Cationic curing agents generate an acid source to initiate the polymerization of an epoxy resin. These cationic curing agents can include a salt having an onium cation and a halogen containing a complex anion of a metal or metalloid. Other curing agents (e.g., amine hardeners and guanidines) for epoxy resins and phenolic resins may also be used.

Other cationic curing agents include a salt having an organometallic complex cation and a halogen containing complex anion of a metal or metalloid which are further described in U.S. Pat. No. 4,751,138 (Tumey et al.). Other examples include an organometallic salt and an onium salt as described in U.S. Pat. No. 4,985,340 (Palazzotto et al.); U.S. Pat. No. 5,086,086 (Brown-Wensley et al.); and U.S. Pat. No. 5,376,428 (Palazzotto et al.). Still other cationic curing agents include an ionic salt of an organometallic complex in which the metal is selected from the elements of Periodic Group IVB, VB, VIB, VIIB and VIIIB which is described in U.S. Pat. No. 5,385,954 (Palazzotto et al.).

Free-radically polymerizable ethylenically-unsaturated compounds polymerize on exposure to free-radicals formed by decomposition of free-radical thermal initiators and/or photoinitiators, or by exposure to particulate (electron beam) or high energy radiation (gamma rays). Compounds that generate a free-radical source if exposed to actinic electromagnetic radiation (e.g., ultraviolet or visible electromagnetic radiation) are generally termed photoinitiators.

Examples of free-radical thermal initiators include peroxides, e.g., benzoyl peroxide and azo compounds.

Examples of photoinitiators include benzoin and its derivatives such as alpha-methylbenzoin; alpha-phenylbenzoin; alpha-allylbenzoin; alpha-benzylbenzoin; benzoin ethers such as benzil dimethyl ketal (e.g., as commercially available as IRGACURE 651 from Ciba Specialty Chemicals, Tarrytown, N.Y.), benzoin methyl ether, benzoin ethyl ether, benzoin n-butyl ether; acetophenone and its derivatives such as 2-hydroxy-2-methyl-1-phenyl-1-propanone (e.g., as DAROCUR 1173 from Ciba Specialty Chemicals) and 1-hydroxycyclohexyl phenyl ketone (e.g., as IRGACURE 184 from Ciba Specialty Chemicals); 2-methyl-1-[4-(methylthio)phenyl]-2-(4-morpholinyl)-1-propanone (e.g., as IRGACURE 907 from Ciba Specialty Chemicals; 2-benzyl-2-(dimethylamino)-1-[4-(4-morpholinyl)phenyl]-1-butanone (e.g., as IRGACURE 369 from Ciba Specialty Chemicals). Other useful photoinitiators include, for example, pivaloin ethyl ether, anisoin ethyl ether, anthraquinones (e.g., anthraquinone, 2-ethylanthraquinone, 1-chloroanthraquinone, 1,4-dimethylanthraquinone, 1-methoxyanthraquinone, or benzanthraquinone), halomethyltriazines, benzophenone and its derivatives, iodonium salts and sulfonium salts, titanium complexes such as bis (eta.sub.5-2,4-cyclopentadien-1-yl)-bis[2,6-difluoro-3-(1H-pyrrol-1-yl)phenyl]titanium (e.g., as CGI 784DC from Ciba Specialty Chemicals); halonitrobenzenes (e.g., 4-bromomethylnitrobenzene), mono- and bis-acylphosphines (e.g., as IRGACURE 1700, IRGACURE 1800, IRGACURE 1850, DAROCUR 4263, and DAROCUR 4265 all from Ciba Specialty Chemicals, and 2,4,6-trimethylbenzoyl¬diphenylphosphine oxide available as LUCIRIN TPO from BASF Corporation, Charlotte, N.C.). Combinations of photoinitiators may be used.

Typically, the curative (e.g., free-radical initiator (photo or thermal) or cationic cure catalyst) is used in amounts ranging from 0.1 to 10 percent, preferably 2 to 4 percent by weight, based on the weight of the binder material precursor, although other amounts may also be used. Additionally, it is preferred to uniformly disperse or dissolve the initiator in the binder matrix precursor prior to the addition of any particulate material, such as the abrasive particles and/or filler particles. One or more spectral sensitizers (e.g., dyes) may be used in conjunction with the photoinitiator(s), for example, in order to increase sensitivity of the photoinitiator to a specific source of actinic radiation. Examples of suitable sensitizers include thioxanthone and 9,10-anthraquinone. In general, the amount of photosensitizer may vary from about 0.01 to 10 percent by weight, more preferably from 0.25 to 4.0 percent by weight, based on the weight of the binder material precursor. Examples of photosensitizers include those available as QUANTICURE ITX, QUANTICURE QTX, QUANTICURE PTX, QUANTICURE EPD from Biddle Sawyer Corp., New York, N.Y.

To promote an association bridge between the binder and the shaped abrasive agglomerate particles, a silane coupling agent may be included in the slurry of shaped abrasive agglomerate particles and binder precursor; typically in an amount of from about 0.01 to 5 percent by weight, more typically in an amount of from about 0.01 to 3 percent by weight, more typically in an amount of from about 0.01 to 1 percent by weight, although other amounts may also be used, for example depending on the size of the abrasive particles. Suitable silane coupling agents include, for example, methacryloxypropyltrimethoxysilane, vinyltriethoxysilane, vinyltris(2-methoxyethoxy)silane, 3,4-epoxycyclohexylmethyltrimethoxysilane, gamma-glycidoxypropyltrimethoxysilane, and gamma-mercaptopropyltrimethoxysilane (e.g., as available under the respective trade designations A-174, A-151, A-172, A-186, A-187, and A-189 from Witco Corp. of Greenwich, Conn.), allyltriethoxysilane, diallyldichlorosilane, divinyldiethoxysilane, and meta, para-styrylethyltrimethoxysilane (e.g., as commercially available under the respective trade designations A0564, D4050, D6205, and S 1588 from United Chemical Industries, Bristol, Pa.), dimethyldiethoxysilane, dihydroxydiphenylsilane, triethoxysilane, trimethoxysilane, triethoxysilanol, 3-(2-aminoethylamino) propyltrimethoxysilane, methyltrimethoxysilane, vinyltriacetoxysilane, methyltriethoxysilane, tetraethyl orthosilicate, tetramethyl orthosilicate, ethyltriethoxysilane, amyltriethoxysilane, ethyltrichlorosilane, amyltrichlorosilane, phenyltrichlorosilane, phenyltriethoxysilane, methyltrichlorosilane, methyldichlorosilane, dimethyldichlorosilane, dimethyldiethoxysilane, and combinations thereof.

The binder and/or binder precursor may optionally contain additives such as, for example, colorants, grinding aids, fillers, viscosity modifying agents, wetting agents, dispersing agents, light stabilizers, and antioxidants.

Fillers useful in the binder generally have an average particle size range of 0.1 to 50 micrometers, typically 1 to 30 micrometers. Examples of useful fillers include metal carbonates (e.g., calcium carbonate such as chalk, calcite, marl, travertine, marble, and limestone; calcium magnesium carbonate; sodium carbonate; and magnesium carbonate), silica (e.g., quartz, glass beads, glass bubbles, and glass fibers), silicates (e.g., talc, clays such as montmorillonite, feldspar, mica, calcium silicate, calcium metasilicate, sodium aluminosilicate, sodium silicate, lithium silicate, and hydrous and anhydrous potassium silicate), metal sulfates (e.g., calcium sulfate, barium sulfate, sodium sulfate, aluminum sodium sulfate, aluminum sulfate), gypsum, vermiculite, wood flour, aluminum trihydrate, carbon black, metal oxides (e.g., calcium oxide such as lime, aluminum oxide, tin oxide such as stannic oxide, titanium dioxide), sulfites (e.g., calcium sulfite), thermoplastic particles (e.g., polycarbonate, polyetherimide, polyester, polyethylene, poly sulfone, polystyrene, acrylonitrile-butadiene-styrene block copolymer, polypropylene, acetal polymers, polyurethanes, nylon particles) and thermosetting particles (e.g., phenolic bubbles, phenolic beads, polyurethane foam particles). The filler may also be a salt such as a halide salt. Examples of halide salts include sodium chloride, potassium cryolite, sodium cryolite, ammonium chloride, potassium tetrafluoroborate, sodium tetrafluoroborate, silicon fluorides, potassium chloride, and magnesium chloride. Other miscellaneous fillers include sulfur, organic sulfur compounds, graphite, and metallic sulfides.

In some embodiments, the polymeric binder has a Knoop hardness of less than 60. The Knoop hardness of the polymeric binder can be influenced, for example, by selection of a filler and coupling agent. In some embodiments, the polymeric binder includes less than 50 percent by weight of any of the fillers described above, based on the total weight of the polymeric binder composition. In some embodiments, the polymeric binder does not include filler or includes less than 5, 4, 3, 2, or 1 percent by weight of any of the fillers described above, based on the total weight of the polymeric binder composition. Knoop hardness numbers for polymeric binders not containing filler generally range from 20 to 50. Knoop hardness can be measured using ASTM D 1474-85 (Method A). In some embodiments, the polymeric binder does not include a silane coupling agent or includes less than 0.5, 0.2, or 0.1 percent by weight of a silane coupling agent, based on the total weight of the polymeric binder composition.

A variety of methods may be suitable for making a coated abrasive article according to the present disclosure. Referring again to FIG. 8, make coat 805 comprising a first organic-based binder precursor can be applied to a major surface of the backing 802 by any suitable technique such as spray coating, roll coating, die coating, powder coating, hot melt coating or knife coating. Shaped abrasive agglomerate particles 804, which can be prepared as described above, can be projected on and adhered in the make coat precursor. In some embodiments, the shaped abrasive agglomerate particles are drop coated. In some embodiments, the agglomerate particles 804 form a monolayer on the backing 802.

In some embodiments, shaped abrasive agglomerate particles 804 are electrostatically coated onto the make coat precursor. Electrostatically-coated shaped abrasive agglomerate particles optimally attach to the make resin coated backing 802 such that their longest axis is normal to the backing 802 as shown in FIG. 8. With more blocky shaped agglomerates such as cubic shapes, such an attachment is not observable.

The resulting construction is then exposed to a first energy source, such as heat or radiation as described above, to at least partially cure the first binder precursor to form a make coat that does not flow. For example, the resulting construction can be exposed to heat at a temperature between 50 to 130° C., in some embodiments 80 to 110° C., for a period of time ranging from 30 minutes to 3 hours. Following this, a size coat comprising a second binder precursor, which may be the same or different from the first binder precursor, is applied over the agglomerate particles by any conventional technique, for example, by spray coating, roll coating, and curtain coating. Finally, the resulting abrasive article is exposed to a second energy source, which may be the same or different from the first energy source, to completely cure or polymerize the make coat and the second binder precursor into thermosetting polymers.

For coated abrasive articles such as those illustrated in FIG. 8, a metallic binder may also be useful in place of make coat 805 and/or size coat 806. For example, electrodeposited metals can be useful to secure shaped abrasive agglomerate particles to a backing 802. Such coated abrasive articles can be made, for example, by depositing metal onto a substrate until a desired thickness is achieved. Shaped abrasive agglomerate particles according to the present disclosure can then be introduced into the plating bath and deposited on the plated metal. Further electrodeposition of metal can be useful to affix the shaped abrasive agglomerate particles to the backing. As a result of this electrodeposition process a single layer of shaped abrasive agglomerate particles can be affixed to the substrate by the electrodeposited metal coating. Further details about metal bond abrasive articles can be found in U.S. Pat. No. 6,319,108 (Adefris et al.). In other embodiments, a vitreous binder may also be useful in place of make coat 805 and/or size coat 806. Any of the glass compositions described above may be useful.

Bonded abrasive articles typically include a shaped mass of abrasive particles held together by an organic, metallic, or vitrified binder. Such shaped mass can be, for example, in the form of a wheel (e.g., such as a grinding wheel or cutoff wheel), a hone, or a whetstone. The diameter of grinding wheels typically is about 1 cm to over 1 meter; the diameter of cut off wheels about 1 cm to over 80 cm (more typically 3 cm to about 50 cm). The cut off wheel thickness is typically about 0.5 mm to about 5 cm, more typically about 0.5 mm to about 2 cm. The shaped mass can also be in the form, for example, of a honing stone, segment, mounted point, disc (e.g. double disc grinder) or other conventional bonded abrasive shape. Bonded abrasive articles typically comprise about 3 to 50 percent by volume bond material, about 30 to 90 percent by volume abrasive particles (or abrasive particle blends), up to 50 percent by volume additives (including grinding aids), and up to 70 percent by volume pores, based on the total volume of the bonded abrasive article. Organic binders can include any of those described above for coated abrasive articles. The amount of organic binder can be adjusted to accommodate porosity in the shaped abrasive agglomerate particles.

Figure 9:
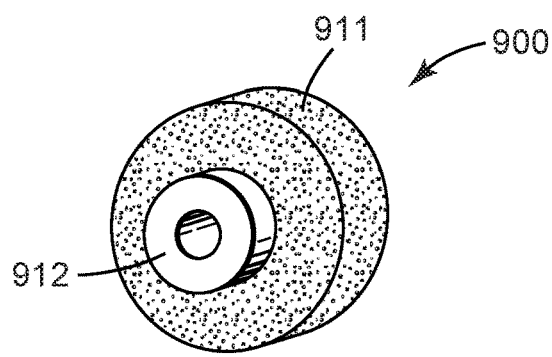
FIG. 9 is a perspective view of an embodiment of a bonded abrasive article according to the present disclosure.

An embodiment of a grinding wheel is shown in FIG. 9. Referring to FIG. 9, grinding wheel 900 is depicted, which includes shaped abrasive agglomerate particles 911 according to the present disclosure, molded in a wheel and mounted on hub 912.

Figure 10:
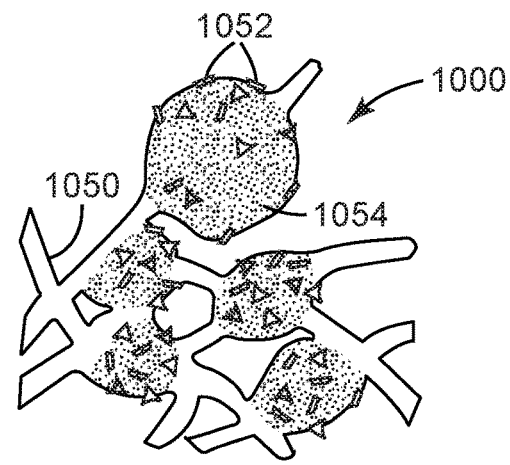
FIG. 10 is an enlarged side view of an embodiment of a nonwoven abrasive article according to the present disclosure.

Nonwoven abrasive articles typically include an open porous lofty polymer filament structure having abrasive particles distributed throughout the structure and adherently bonded therein by an organic binder. Examples of filaments include polyester fibers, polyamide fibers, and polyaramid fibers. An embodiment of a nonwoven abrasive article according to the present disclosure is shown in FIG. 10. Referring to FIG. 10, a schematic depiction, greatly enlarged, of a typical nonwoven abrasive article 1000 is shown, comprises lofty open fibrous mat 1050 as a substrate, onto which shaped abrasive agglomerate particles 1052 made according to the present disclosure are adhered by binder 1054.

Nonwoven abrasives according to the present disclosure include nonwoven webs suitable for use in abrasives. The term "nonwoven" refers to a material having a structure of individual fibers or threads that are interlaid but not in an identifiable manner such as in a knitted fabric. Typically, the nonwoven web comprises an entangled web of fibers. The fibers may comprise continuous fiber, staple fiber, or a combination thereof. For example, the nonwoven web may comprise staple fibers having a length of at least about 20 mm, at least about 30 mm, or at least about 40 mm, and less than about 110 mm, less than about 85 mm, or less than about 65 mm, although shorter and longer fibers (e.g., continuous filaments) may also be useful. The fibers may have a fineness or linear density of at least about 1.7 decitex (dtex, i.e., grams/10000 meters), at least about 6 dtex, or at least about 17 dtex, and less than about 560 dtex, less than about 280 dtex, or less than about 120 dtex, although fibers having lesser and/or greater linear densities may also be useful. Mixtures of fibers with differing linear densities may be useful, for example, to provide an abrasive article that upon use will result in a specifically preferred surface finish. If a spunbond nonwoven is used, the filaments may be of substantially larger diameter, for example, up to 2 mm or more in diameter.

The nonwoven web may be manufactured, for example, by conventional air laid, carded, stitch bonded, spun bonded, wet laid, and/or melt blown procedures. Air laid nonwoven webs may be prepared using equipment such as, for example, that available under the trade designation "RANDO WEBBER" commercially available from Rando Machine Company of Macedon, N.Y.

Nonwoven webs are typically selected to be suitably compatible with adhering binders and abrasive particles while also being processable in combination with other components of the article, and typically can withstand processing conditions (e.g., temperatures) such as those employed during application and curing of the curable composition. The fibers may be chosen to affect properties of the abrasive article such as, for example, flexibility, elasticity, durability or longevity, abrasiveness, and finishing properties. Examples of fibers that may be suitable include natural fibers, synthetic fibers, and mixtures of natural and/or synthetic fibers. Examples of synthetic fibers include those made from polyester (e.g., polyethylene terephthalate), nylon (e.g., hexamethylene adipamide, polycaprolactam), polypropylene, acrylonitrile (i.e., acrylic), rayon, cellulose acetate, polyvinylidene chloride-vinyl chloride copolymers, and vinyl chloride-acrylonitrile copolymers. Examples of suitable natural fibers include cotton, wool, jute, and hemp. The fiber may be of virgin material or of recycled or waste material, for example, reclaimed from garment cuttings, carpet manufacturing, fiber manufacturing, or textile processing. The fiber may be homogenous or a composite such as a bicomponent fiber (e.g., a co-spun sheath-core fiber). The fibers may be tensilized and crimped but may also be continuous filaments such as those formed by an extrusion process. Combinations of fibers may also be used.

Binders useful for bonding the shaped abrasive agglomerate particles according to the present disclosure onto and into the nonwoven web can include any of those described above. Before impregnation with the binder precursor, the nonwoven fiber web typically has a weight per unit area (i.e., basis weight) of at least about 50 grams per square meter (gsm), at least about 100 gsm, or at least about 200 gsm; and/or less than about 400 gsm, less than about 350 gsm, or less than about 300 gsm, as measured prior to any coating (e.g., with the curable composition or optional pre-bond resin), although greater and lesser basis weights may also be used. In addition, before impregnation with the binder precursor, the fiber web typically has a thickness of at least about 5 mm, at least about 6 mm, or at least about 10 mm; and/or less than about 200 mm, less than about 75 mm, or less than about 30 mm, although greater and lesser thicknesses may also be useful.

Further details concerning nonwoven abrasive articles, abrasive wheels and methods for their manufacture may be found, for example, in U.S. Pat. No. 2,958,593 (Hoover et al.); U.S. Pat. No. 5,591,239 (Larson et al.); U.S. Pat. No. 6,017,831 (Beardsley et al.); and U.S. Pat. Appln. Publ. 2006/0041065 A 1 (Barber, Jr.).

Frequently, it is useful to apply a prebond resin to the nonwoven web before coating with the binder precursor. The prebond resin serves, for example, to help maintain the nonwoven web integrity during handling, and may also facilitate bonding of the binder to the nonwoven web. Examples of prebond resins include phenolic resins, urethane resins, hide glue, acrylic resins, urea-formaldehyde resins, melamine-formaldehyde resins, epoxy resins, and combinations thereof. The amount of prebond resin used in this manner is typically adjusted toward the minimum amount consistent with bonding the fibers together at their points of crossing contact. If the nonwoven web includes thermally bondable fibers, thermal bonding of the nonwoven web may also be helpful to maintain web integrity during processing.

Abrasive articles according to the present disclosure may be converted, for example, into a belt, tape roll, disc, or sheet. They may be used by hand or in combination with a machine such as a belt grinder. For belt applications, the two free ends of an abrasive sheet are joined together and spliced, thus forming an endless belt. A spliceless belt, for example, as described in WO 93/12911 (Benedict), can also be used. Generally, an endless abrasive belt can traverse over at least one idler roll and a platen or contact wheel. The hardness of the platen or contact wheel is adjusted to obtain the desired rate of cut and workpiece surface finish. The abrasive belt speed depends upon the desired cut rate and surface finish and generally ranges anywhere from about 20 to 100 surface meters per second, typically between 30 to 70 surface meter per second. The belt dimensions can range from about 0.5 cm to 100 cm wide or 1.0 cm to 30 cm wid, and from about 5 cm to 1,000 cm long or from 50 cm to 500 cm long. Abrasive tapes are continuous lengths of the abrasive article and can range in width from about 1 mm to 1,000 mm or from about 5 mm to 250 mm. The abrasive tapes are usually unwound, traversed over a support pad that forces the tape against the workpiece, and then rewound. The abrasive tapes can be continuously fed through the abrading interface and can be indexed. Abrasive discs, which may also include that which is in the shape known in the abrasive art as "daisy", can range from about 50 mm to 1,000 mm in diameter or about 50 mm to about 100 mm in diameter. Typically, abrasive discs are secured to a back-up pad by an attachment means and can rotate between 100 to 20,000 revolutions per minute, typically between 1,000 to 15,000 revolutions per minute.

Useful abrasive brushes include those having a plurality of bristles unitary with a backing (see, e.g., U.S. Pat. No. 5,427,595 (Pihl et al.), U.S. Pat. No. 5,443,906 (Pihl et al.), U.S. Pat. No. 5,679,067 (Johnson et al.), and U.S. Pat. No. 5,903,951 (Ionta et al.)). Desirably, such brushes are made by injection molding a mixture of polymer and abrasive particles.

The abrasive article can be used to abrade a workpiece. The workpiece can be any type of material such as metal, metal alloys, exotic metal alloys, ceramics, glass, wood, wood like materials, composites, painted surface, plastics, reinforced plastic, stones, and combinations thereof. The workpiece may be flat or may have a shape or contour associated with it. Examples of workpieces include glass eye glasses, plastic eye glasses, plastic lenses, glass television screens, metal automotive components (e.g., clutch plates and other flat automotive components), stainless steel coils, plastic components, particle board, painted automotive components, magnetic media, tubing, plates, hydraulic rods, and elevator shafts.

During abrading, the abrasive article and the workpiece are moved relative to each other such that the abrasive article abrades the workpiece. The abrasive article is moved relative to the workpiece, or vice versa. Depending upon the application, the force at the abrading interface can range from about 0.1 kg to over 1000 kg. Typically, this range is between 1 kg to 500 kg of force at the abrading interface. In addition, abrading may occur under wet conditions. Wet conditions can include water and/or a liquid organic compound. Examples of typical liquid organic compounds include lubricants, oils, emulsified organic compounds, cutting fluids, and soaps. These liquids may also contain other additives such as defoamers, degreasers, and corrosion inhibitors. The abrasive article may oscillate at the abrading interface during use, which may result in a finer surface on the workpiece being abraded.

Consistent material removal rates over the life of an abrasive tool are desirable for many abrasive processes. However, the useful lifespan of an abrasive tool can be limited by a required break-in time at the beginning of use and/or higher requisite forces to achieve specific material removal rates after significant wear, possibly causing out-of-specification finishes or workpiece burn.

To achieve a consistent material removal rate, a particular hardness, chemical property, and breakdown/fracture behavior of an abrasive mineral can be targeted by influencing the microstructure and secondary phases within the grain. However, this approach does not always lead to a desirable consistency in material removal rate.

Grinding results for Examples 6 and 7 and Comparative Example A in the Examples, below, demonstrate that coated abrasive articles including shaped abrasive agglomerate particles according to the present disclosure can exhibit unexpected extended life and stable cut-rates over that life when compared to a construction having the same shaped abrasive particle in a monolayer. Also, grinding results for Examples 6 and 7 and Illustrative Example 5 demonstrate that coated abrasive articles including shaped abrasive agglomerate particles according to the present disclosure can exhibit unexpectedly higher cut rates than other agglomerate particles having the same agglomerate shape but including fused alumina instead of the shaped abrasive particles.

Furthermore, a comparison of grinding results of Example 2 vs. Illustrative Example 2, Example 3 vs. Illustrative Example 3, and Examples 10 and 11 vs. Illustrative Example 7 demonstrates that shaped abrasive agglomerate particles according to the present disclosure can be useful for providing abrasive articles that can exhibit unexpected grinding performance, extended life, and stable cut-rates over that extended life when compared to shaped agglomerates having more blocky shapes (e.g., more cubic shapes).

Some Embodiments of the Disclosure

In a first embodiment, the present disclosure provides a shaped abrasive agglomerate particle comprising shaped abrasive particles bonded in a vitreous matrix, wherein the shaped abrasive particles have a longest particle lineal dimension on a surface and a shortest particle dimension perpendicular to the longest particle lineal dimension, wherein the longest particle lineal dimension is at least twice the shortest particle dimension, wherein the shaped abrasive agglomerate particle has a longest agglomerate lineal dimension on a surface and a shortest agglomerate dimension perpendicular to the longest agglomerate lineal dimension, and wherein the longest agglomerate lineal dimension is at least twice the shortest agglomerate dimension.

In a second embodiment, the present disclosure provides the shaped abrasive agglomerate particle of the first embodiment, wherein the longest particle lineal dimension is at least three times the shortest particle dimension.

In a third embodiment, the present disclosure provides the shaped abrasive agglomerate particle of the first or second embodiment, wherein the longest agglomerate lineal dimension is at least three times the shortest agglomerate dimension.

In a fourth embodiment, the present disclosure provides the shaped abrasive agglomerate particle of any one of the first to third embodiments, wherein the shaped abrasive particle has a sloping side wall.

In a fifth embodiment, the present disclosure provides the shaped abrasive agglomerate particle of any one of the first to fourth embodiments, wherein the shaped abrasive agglomerate particle has a sloping side wall.

In a sixth embodiment, the present disclosure provides the shaped abrasive agglomerate particle of any one of the third to fifth embodiments, wherein the shaped abrasive particle has an angle in a range from 95 degrees to 130 degrees between a first face and the sloping side wall.

In a seventh embodiment, the present disclosure provides the shaped abrasive agglomerate particle of any one of the fourth to sixth embodiments, wherein the shaped abrasive agglomerate particle has an angle in a range from 95 degrees to 130 degrees between a first face and the sloping side wall.

In an eighth embodiment, the present disclosure provides the shaped abrasive agglomerate particle of any one of the first to seventh embodiments, wherein the shaped abrasive particle has a frusto-pyramidal shape.

In a ninth embodiment, the present disclosure provides the shaped abrasive agglomerate particle of any one of the first to eighth embodiments, wherein the shaped abrasive agglomerate particle has a frusto-pyramidal shape.

In a tenth embodiment, the present disclosure provides the shaped abrasive agglomerate particle of any one of the first to ninth embodiments, wherein at least one of the shaped abrasive particle or the shaped abrasive agglomerate particle has a triangular frustum shape.

In an eleventh embodiment, the present disclosure provides the shaped abrasive agglomerate particle of any one of the first to seventh embodiments, wherein at least one of the shaped abrasive agglomerate particle or the shaped abrasive particle has a perimeter with an interior angle of less than 60 degrees.

In a twelfth embodiment, the present disclosure provides the shaped abrasive agglomerate particle of any one of the first to seventh or eleventh embodiments, wherein at least one of the shaped abrasive agglomerate particle or the shaped abrasive particle has an arrowhead shape.

In a thirteenth embodiment, the present disclosure provides the shaped abrasive agglomerate particle of any one of the first to twelfth embodiments, wherein the shaped abrasive particle and the shaped abrasive agglomerate particle have the same shape.

In a fourteenth embodiment, the present disclosure provides the shaped abrasive agglomerate particle of any one of the first to seventh embodiments, wherein the shaped abrasive particles comprise abrasive shards.

In a fifteenth embodiment, the present disclosure provides the shaped abrasive agglomerate particle of any one of the first to the fourteenth embodiments, wherein the shaped abrasive particles comprise ceramic.

In a sixteenth embodiment, the present disclosure provides the shaped abrasive agglomerate particle of any one of the first to fifteenth embodiments, wherein the shaped abrasive particles comprise alpha alumina.

In a seventeenth embodiment, the present disclosure provides the shaped abrasive agglomerate particle of any one of the first to the sixteenth embodiments, wherein the shaped abrasive particles are present in a range from 70 percent by weight to 95 percent by weight and the vitreous matrix is present at least at five percent by weight, based on the weight of the shaped abrasive agglomerate particle.

In an eighteenth embodiment, the present disclosure provides the shaped abrasive agglomerate particle of any one of the first to seventeenth embodiments, wherein the shaped abrasive particles are present in a range from 70 percent by weight to 85 percent by weight and the vitreous matrix is present at least at 15 percent by weight, based on the weight of the abrasive agglomerate particle.

In a nineteenth embodiment, the present disclosure provides the shaped abrasive agglomerate particle of any one of the first to the eighteenth embodiments, wherein the longest particle lineal dimension is up to 1600 micrometers.

In a twentieth embodiment, the present disclosure provides the shaped abrasive agglomerate particle of the nineteenth embodiment, wherein the longest particle lineal dimension is up to 500 micrometers.

In a twenty-first embodiment, the present disclosure provides the shaped abrasive agglomerate particles of any one of the first to twentieth embodiments, wherein the longest agglomerate lineal dimension is up to 5 millimeters.

In a twenty-second embodiment, the present disclosure provides the shaped abrasive agglomerate particles of any one of the first to twenty-first embodiments, wherein the longest agglomerate lineal dimension is up to 2 millimeters.

In a twenty-third embodiment, the present disclosure provides the shaped abrasive agglomerate particles of any one of the first to twenty-second embodiments, wherein the vitreous matrix has a coefficient of thermal expansion in a range from $4\times10^{-6}$/K to $16\times10^{-6}$/K.

In a twenty-fourth embodiment, the present disclosure provides the shaped abrasive agglomerate particles of any one of the first to twenty-third embodiments, wherein the abrasive agglomerate particle has engineered porosity.

In a twenty-fifth embodiment, the present disclosure provides a method of making a plurality of the shaped abrasive agglomerate particles of any one of the first to twenty-fourth embodiments, the method comprising:
 filling a mold having a plurality of cavities with a slurry comprising a glass frit, the shaped abrasive particles, and a volatile liquid;
 removing at least a portion of the volatile liquid to provide shaped precursor agglomerate particles; and
 firing the shaped precursor agglomerate particles to provide the shaped abrasive agglomerate particles.

In a twenty-sixth embodiment, the present disclosure provides the method of the twenty-fifth embodiment, wherein the slurry further comprises a temporary organic binder.

In a twenty-seventh embodiment, the present disclosure provides the method of the twenty-fifth or twenty-sixth embodiment, wherein the slurry further comprises a rheology modifier.

In a twenty-eighth embodiment, the present disclosure provides the method of the twenty-seventh embodiment, wherein the rheology modifier is fumed silica.

In a twenty-ninth embodiment, the present disclosure provides a method of making a plurality of the shaped abrasive agglomerate particles of any one of the first to twenty-fourth embodiments, the method comprising:

filling a mold having a plurality of cavities with a mixture comprising a glass frit, the shaped abrasive particles, and a temporary organic binder;

at least one of heating or irradiating the mixture to provide shaped precursor agglomerate particles; and firing the shaped precursor agglomerate particles to provide the shaped abrasive agglomerate particles.

In a thirtieth embodiment, the present disclosure provides an abrasive article comprising a plurality of the shaped abrasive agglomerate particles of any one of the first to twenty-fourth embodiments retained in a binder.

In a thirty-first embodiment, the present disclosure provides the abrasive article of the thirtieth embodiment, wherein the abrasive article is a coated abrasive article, comprising a backing and the plurality of shaped abrasive agglomerate particles attached to the backing with a polymeric binder.

In a thirty-second embodiment, the present disclosure provides the abrasive article of the thirty-first embodiment, wherein the polymeric binder comprises a phenolic binder.

In a thirty-third embodiment, the present disclosure provides the abrasive article of the thirtieth embodiment, wherein the abrasive article comprises a nonwoven abrasive article.

In a thirty-fourth embodiment, the present disclosure provides the abrasive article of any one of the thirtieth to the thirty-third embodiments, wherein the abrasive article is a belt, tape roll, disc, or sheet.

In a thirty-fifth embodiment, the present disclosure provides the abrasive article of the thirtieth embodiment, wherein the abrasive article comprises a bonded abrasive article.

In a thirty-sixth embodiment, the present disclosure provides the abrasive article of the thirty-fifth embodiment, wherein the bonded abrasive article comprises a bonded abrasive wheel.

In a thirty-seventh embodiment, the present disclosure provides a method of abrading a workpiece, the method comprising:

contacting the workpiece with the abrasive article of any one of the twenty-sixth to thirty-second embodiments, and moving the workpiece and the abrasive article relative to each other to abrade the workpiece.

In a thirty-eighth embodiment, the present disclosure the method of the thirty-seventh embodiment, wherein the workpiece comprises at least one of stainless steel, carbon steel, or titanium.

In order that the present disclosure can be more fully understood, the following examples are set forth. It should be understood that these examples are for illustrative purposes only, and are not to be construed as limiting this disclosure in any manner. For example, the particular materials and amounts thereof recited in these examples, as well as other conditions and details, should not be construed to unduly limit this disclosure.

EXAMPLES

Unless otherwise noted, all parts, percentages, ratios, etc. in the Examples and the rest of the specification are by weight. Unless stated otherwise, all other reagents were obtained, or are available from fine chemical vendors such as Sigma-Aldrich Company, St. Louis, Mo., or may be synthesized by known methods. In the Examples, the following unit abbreviations are used: ° C. for degrees Centigrade, cm for centimeter, g/m$^2$ for grams per square meter, and mm for millimeter. Materials used in the Examples are described in Table 1, below.

TABLE 1

| ABBREVIATION | DESCRIPTION |
| --- | --- |
| DEX1 | Dextrin powder, obtained from A.E. Staley, Decatur, Illinois |
| DEX2 | Dextrin, obtained under the trade designation "STADEX 201" from Tate & Lyle, London, United Kingdom |
| EMU | Emulsifier oleic acid ethoxylate, obtained under trade designation "EMULAN A" from BASF, Ludwigshafen, Germany |
| GP | Aluminum-borosilicate glass powder, obtained under the trade designations "SP1086" from Specialty Glass Inc., Oldsmar, Florida |
| P120 | Crushed ceramic abrasive particle conforming the FEPA (Federation of the European Producers of Abrasives) standard for P120, obtained under trade designation "351 CERAMIC GRAIN" from 3M Company, Saint Paul, Minnesota |
| PR | Resole phenol-formaldehyde resin, obtained under trade designation "GP 8339 R-23155B" from Georgia Pacific Chemicals, Atlanta, Georgia, a 1.5:1 to 2.1:1 (phenol:formaldehyde) condensate catalyzed by 1%-5% potassium hydroxide |
| SAP1 | Shaped abrasive particles were prepared according to the disclosure of U.S. Pat. No. 8,142,531 (Adefris et al). The shaped abrasive particles were prepared by molding alumina sol gel in equilateral triangle-shaped polypropylene mold cavities. After drying and firing, the resulting shaped abrasive particles were about 0.18 mm (side length) × 0.04 mm thick, with a draft angle approximately 98 degrees. |
| SAP2 | Shaped abrasive particles were prepared according to the disclosure of U.S. Pat. No. 8,142,531 (Adefris et al). The shaped abrasive particles were |

TABLE 1-continued

| ABBREVIATION | DESCRIPTION |
|---|---|
| | prepared by molding alumina sol gel in equilateral triangle-shaped polypropylene mold cavities. After drying and firing, the resulting shaped abrasive particles were about 0.33 mm (side length) × 0.10 mm thick, with a draft angle approximately 98 degrees. |
| SAP3 | Shaped abrasive particles were prepared according to the disclosure of U.S. Pat. No. 8,142,531 (Adefris et al). The shaped abrasive particles were prepared by molding alumina sol gel in equilateral triangle-shaped polypropylene mold cavities. After drying and firing, the resulting shaped abrasive particles were about 0.100 mm (side length) × 0.033 mm thick, with a draft angle approximately 98 degrees. |
| V601 | A glass frit blend |

Performance Test

The abrasive discs were tested using the following procedure. Abrasive discs for evaluation were attached to a rotary grinder fitted with a 7-inch (17.8 cm) ribbed disc pad face plate, obtained as "80514 EXTRA HARD RED" from 3M Company, St. Paul, Minn. The grinder was then activated and urged against an end face of a 0.75 inch×0.75 inch (1.9 cm×1.9 cm) pre-weighed 1045 medium carbon steel bar under a load of 12 pounds (4.5 kilograms). The rotational speed of the disc pad face plate under the above load condition against the workpiece was maintained at 5000 revolutions per minute. The workpiece was abraded under these conditions for a number of 10-second grinding intervals (cycles). Following each 10-second cycle, the workpiece was allowed to cool to room temperature and weighed to determine the cut of the abrasive operation. Test results were reported as cumulated cut or incremental cut vs. number of cycles.

Example 1 to 3 and Illustrative Examples 1 to 3

Example 1

A slurry was prepared by mixing the components listed in Table 2. The components were mixed using a high-shear mixer for 30 minutes. The resultant slurry was coated into a polypropylene mold with equilateral triangle cavities of 0.42 mm depth and 1.56 mm side length. The draft angle between the sidewall and bottom of the cavities in the mold was 98 degrees. Then the slurry was dried at 23° C. for 1 hour and in an oven at 110° C. for 30 minutes to form shaped agglomerates.

TABLE 2

| Component | Weight, grams |
|---|---|
| Water | 65 |
| SAP1 | 75 |
| GP | 25 |
| 25% Solution of DEX1 in Water | 20 |
| Total | 185 |

The dried shaped agglomerates were released from the tooling using an ultrasonic horn before being fired at higher temperatures (the conditions were programmed as in Table 3) in a refractory sager in a box kiln.

TABLE 3

| Segment | Heating Ramp, ° C./minute | Temperature, ° C. | Dwell (hours per kilogram dried agglomerates) |
|---|---|---|---|
| 1 | 2.0 | 400 | 2 |
| 2 | 2.0 | 720 | 1 |
| 3 | 2.0 | 23 | 0 |

The resulting fired agglomerates consisted of 75 parts of SAP1 and 25 parts of GP.

Illustrative Example 1

The procedure generally described in Example 1 was repeated, with the exception that the slurry was coated into a polypropylene mold with cavities having square openings approximately 0.87 mm long and wide and square bases approximately 0.65 mm long and wide; the depth of these cavities were 0.76 mm.

Example 2

A fiber disc with 7-inch (17.8-cm) diameter, obtained as "DYNOS VULCANIZED FIBER" from Dynos GmbH, Troisdorf Germany, was coated with 143 g/m$^2$ of a make resin consisting of 49.15 parts of PR, 40.56 parts of calcium carbonate (obtained under trade designation "HUBER-CARB Q325" from Huber Carbonates LLC, Atlanta, Ga.), 10.19 parts of water and 0.10% of EMU, using a knife to fill the backing weave and remove excess resin. Agglomerates made from Example 1 were applied to the make resin-coated backing by electrostatic coating. The coating weight of agglomerates was 10 grams over the sample. The abrasive coated backing was placed in an oven at 90° C. for 90 minutes and 105° C. for 60 minutes to partially cure the make resin. A size resin consisting of 29.42 parts of PR, 18.12 parts of water, 50.65 parts of cryolite (Solvay Fluorides, LLC, Houston, Tex.), and 1.81 parts of EMU was applied to each strip of backing material at a basis weight of 409 g/m$^2$, and the coated fiber disc was placed in an oven at 90° C. for 90 minutes and 105° C. for 12 hours to cure.

Example 3

The procedure generally described in Example 2 was repeated, with the exception that the coating weight of agglomerates was 15 grams over the sample.

Illustrative Example 2

The procedure generally described in Example 2 was repeated, with the exception that 10 grams agglomerates made from Illustrative Example 1 were applied.

Illustrative Example 3

The procedure generally described in Illustrative Example 2 was repeated, with the exception that the coating weight of agglomerates was 15 grams over the sample.

The coated fiber discs made from Examples 2 and 3 and Illustrative Examples 2 and 3 were tested according to the description of Performance Test. The test results of cumulated cut vs. numbers of cycles are shown in Table 4.

TABLE 4

| | Cumulated Cut, Grams | | | |
|---|---|---|---|---|
| Cycle | Example 2 | Example 3 | Illustrative Ex. 2 | Illustrative Ex. 3 |
| 1 | 14.785 | 15.18 | 12.505 | 11.67 |
| 2 | 28.065 | 28.98 | 23.77 | 21.91 |
| 3 | 39.805 | 41.35 | 34.355 | 31.4 |
| 4 | 50.575 | 53.18 | 43.94 | 40.03 |
| 5 | 60.615 | 64.53 | 52.64 | 47.44 |
| 6 | 69.72 | 75.49 | 60.41 | 53.38 |
| 7 | 77.465 | 85.65 | 67.43 | 58.33 |
| 8 | 83.96 | 94.77 | 73.615 | 62.68 |
| 9 | 89.555 | 102.47 | 79.085 | 66.59 |
| 10 | 94.45 | 108.88 | 83.7 | 70.06 |
| 11 | 99.03 | 114.28 | 87.67 | 73.28 |
| 12 | 103.09 | 119.21 | 91.225 | 76.33 |
| 13 | 106.91 | 123.66 | 94.485 | 79.13 |
| 14 | 110.47 | 127.8 | 97.51 | 81.86 |
| 15 | 113.82 | 131.79 | 100.445 | 84.51 |
| 16 | 116.995 | 135.62 | 103.19 | 86.98 |
| 17 | 120.055 | 139.27 | 105.78 | 89.43 |
| 18 | 123.165 | 142.76 | 108.4 | 91.69 |
| 19 | 126.195 | 146.22 | 110.86 | — |
| 20 | 129.025 | 149.47 | 113.25 | — |

Examples 4 to 7, Illustrative Examples 4 and 5, and Comparative Example A

Example 4

A slurry was prepared by mixing the components listed in Table 5, below. The components were mixed using a high-shear mixer for 30 minutes. The resultant slurry was coated into a polypropylene mold with equilateral triangle cavities of 0.42 mm depth and 1.68 mm side length. The draft angle between the sidewall and bottom of the cavities in the mold was 98 degrees. Then the slurry was dried at 23° C. for 1 hour and in an oven at 110° C. for 30 minutes to form shaped agglomerates.

TABLE 5

| Component | Weight, grams |
|---|---|
| Water | 65 |
| SAP2 | 75 |
| GP | 25 |
| 25% Solution of DEX1 in Water | 20 |
| Total | 185 |

The dried shaped agglomerates were released from the tooling using an ultrasonic horn before being fired at higher temperatures (the conditions were programmed as in Table 3) in a refractory sager in a box kiln. The resulting fired agglomerates consisted of 75 parts of SAP2 and 25 parts of GP. A photo of the resulting agglomerate of Example 4 is shown in FIG. 6.

Example 5

The procedure generally described in Example 4 was repeated, with the exception that the slurry was coated into a polypropylene mold with cavities having square openings approximately 1.40 mm long and wide and square bases approximately 1.40 mm long and wide; the depth of these cavities were 0.42 mm. A photo of the resulting agglomerates of Example 5 is shown in FIG. 7.

Illustrative Example 4

The procedure generally described in Example 4 was repeated, with the exception that "P120 grade 321 ceramic grain" obtained from 3M Company was used in the slurry instead of SAP2.

Example 6

A fiber disc with 7-inch (17.8-cm) diameter, obtained as "DYNOS VULCANIZED FIBER" from Dynos GmbH, Troisdorf Germany, was coated with 143 g/m$^2$ of a make resin consisting of 49.15 parts of PR, 40.56 parts of calcium carbonate (obtained under trade designation "HUBER-CARB Q325" from Huber Carbonates LLC, Atlanta, Ga.), 10.19 parts of water and 0.10% of EMU, using a knife to fill the backing weave and remove excess resin. Agglomerates made from Example 4 were applied to the make resin-coated backing by electrostatic coating. The coating weight of agglomerates was 10 grams over the sample. The abrasive coated backing was placed in an oven at 90° C. for 90 minutes and 105° C. for 60 minutes to partially cure the make resin. A size resin consisting of 29.42 parts of PR, 18.12 parts of water, 50.65 parts of cryolite (Solvay Fluorides, LLC, Houston, Tex.), and 1.81 parts of EMU was applied to each strip of backing material at a basis weight of 409 g/m$^2$, and the coated fiber disc was placed in an oven at 90° C. for 90 minutes and 105° C. for 12 hours to cure.

Example 7

The procedure generally described in Example 6 was repeated, with the exception that 15 grams agglomerates made from Example 5 were applied.

Illustrative Example 5

The procedure generally described in Example 6 was repeated, with the exception that 10 grams agglomerates made from Illustrative Example 4 were applied.

Comparative Example A

The procedure generally described in Example 6 was repeated, with the exception that 4 grams abrasive particle SAP2 was used instead of agglomerate.

The coated fiber discs made from Examples 9 to 10 and Comparative Examples B to C were tested according to the description of Performance Test. The test results of incremental cut vs. numbers of cycles and total cut are shown in Table 6.

TABLE 6

| | Incremental Cut, Grams | | | |
|---|---|---|---|---|
| Cycle | Example 6 | Example 7 | Comparative Example A | Illustrative Example 5 |
| 1 | 12.20 | 9.24 | 16.18 | 5.95 |
| 2 | 11.45 | 8.85 | 13.77 | 5.71 |
| 3 | 10.88 | 8.56 | 13.00 | 5.15 |
| 4 | 10.42 | 8.47 | 12.61 | 4.78 |
| 5 | 9.99 | 8.64 | 11.97 | 4.46 |
| 6 | 9.62 | 8.41 | 11.40 | 4.18 |
| 7 | 9.29 | 8.29 | 10.88 | 3.89 |
| 8 | 9.20 | 7.99 | 10.09 | 3.60 |
| 9 | 9.14 | 8.05 | 9.38 | 3.31 |
| 10 | 9.16 | 7.94 | 8.29 | 3.14 |
| 11 | 8.92 | 7.71 | 7.38 | 2.77 |
| 12 | 8.75 | 7.60 | 6.39 | 2.55 |
| 13 | 8.52 | 7.66 | 5.51 | 2.33 |
| 14 | 8.56 | 7.66 | 4.86 | 2.23 |
| 15 | 8.43 | 7.83 | 4.37 | 2.08 |
| 16 | 8.33 | 7.43 | 4.09 | 1.99 |
| 17 | 8.39 | 7.25 | 3.79 | 1.89 |
| 18 | 8.37 | 7.14 | 3.63 | 1.83 |
| 19 | 8.32 | 7.27 | 3.44 | 1.73 |
| 20 | 8.22 | 7.06 | 3.31 | 1.72 |
| 21 | 8.31 | 7.11 | 3.24 | 1.63 |
| 22 | 8.31 | 6.97 | 3.05 | 1.57 |

Examples 8 to 11 and Illustrative Examples 6 to 8

Example 8

A slurry was prepared by mixing the components listed in Table 7. The components were mixed using a high-shear mixer for 30 minutes. The resultant slurry was coated into a polypropylene mold with equilateral triangle cavities of 0.26 mm depth and 1.56 mm side length. The draft angle between the sidewall and bottom of the cavities in the mold was 98 degrees. Then the slurry was dried in an oven at 110° C. for 20 minutes to form shaped agglomerates.

TABLE 7

| Component | Weight, grams |
|---|---|
| Water | 133.5 |
| SAP3 | 230 |
| V601 | 77.5 |
| DEX2 | 9.2 |

The dried shaped agglomerates were released from the tooling using an ultrasonic horn, and subsequently mixed with fine grade alumina powder (obtained under trade designation "G52" (conforming the FEPA standard for P600) from Washington Mills, Niagara Falls, N.Y.), before being fired at higher temperatures (the conditions were programmed as in Table 8) in a refractory sager in a box kiln. After firing the refractory sager were allowed to cool naturally to near 23° C. The resulting fired agglomerates consisted of 75 parts of SAP3 and 25 parts of V601.

TABLE 8

| Segment | Heating Ramp (° C./minute) | Temperature (° C.) | Dwell (hours) |
|---|---|---|---|
| 1 | 2.0 | 420 | 2 |
| 2 | 2.0 | 700 | 0.5 |
| 3 | 3.0 | 880 | 4 |

Example 9

The procedure generally described in Example 8 was repeated, with the exception that the slurry was coated into a polypropylene mold with equilateral triangle cavities of 0.42 mm depth and 1.56 mm side length. The draft angle between the sidewall and bottom of the cavities in the mold was 98 degrees.

Illustrative Example 6

The procedure generally described in Example 8 was repeated, with the exception that the slurry was coated into a polypropylene mold with cavities having square openings approximately 0.87 mm long and wide and square bases approximately 0.65 mm long and wide; the depth of these cavities were 0.76 mm.

Example 10

A fiber disc with 7-inch (17.8-cm) diameter obtained as "DYNOS VULCANIZED FIBER" from Dynos GmbH, Troisdorf Germany, was coated with 143 g/m$^2$ of a make resin consisting of 49.15 parts of PR, 40.56 parts of calcium carbonate (obtained under trade designation "HUBER-CARB Q325" from Huber Carbonates LLC, Atlanta, Ga.), 10.19 parts of water and 0.10% of EMU, using a knife to fill the backing weave and remove excess resin. Agglomerates made from Example 8 were applied to the make resin-coated backing by electrostatic coating. The coating weight of agglomerates was 10 grams over the sample. The abrasive coated backing was placed in an oven at 90° C. for 90 minutes and 105° C. for 60 minutes to partially cure the make resin. A size resin consisting of 29.42 parts of PR, 18.12 parts of water, 50.65 parts of cryolite (Solvay Fluorides, LLC, Houston, Tex.), and 1.81 parts of EMU was applied to each strip of backing material at a basis weight of 409 g/m$^2$, and the coated fiber disc was placed in an oven at 90° C. for 90 minutes and 105° C. for 12 hours to cure.

Example 11

The procedure generally described in Example 10 was repeated, with the exception that 10 grams agglomerates made from Example 9 were applied.

Illustrative Example 7

The procedure generally described in Example 10 was repeated, with the exception that 10 grams agglomerates made from Illustrative Example 6 were applied.

Illustrative Example 8

The procedure generally described in Example 10 was repeated, with the exception that 15 grams agglomerates made from Illustrative Example 6 were applied.

The coated fiber discs made from Examples 10 and 11 and Illustrative Examples 7 and 8 were tested according to the description of Performance Test. The test results of cumulative cut vs. number of cycles are shown in Table 9.

TABLE 9

| | Cumulated Cut, Grams | | | |
|---|---|---|---|---|
| Cycle | Example 10 | Example 11 | Illustrative Example 7 | Illustrative Example 8 |
| 1 | 8.24 | 7.125 | 4.22 | 3.73 |
| 2 | 14.74 | 12.5 | 8.1 | 6.66 |
| 3 | 19.965 | 17.335 | 10.83 | 8.76 |
| 4 | 23.84 | 20.575 | 13.05 | 10.48 |
| 5 | 26.915 | 23.295 | 14.85 | 11.91 |
| 6 | 29.63 | 25.725 | 16.4 | 13.18 |
| 7 | 32.09 | 27.86 | 17.76 | 14.31 |
| 8 | 34.305 | 29.74 | 19.02 | 15.32 |
| 9 | 36.34 | 31.535 | 20.11 | 16.22 |
| 10 | 38.225 | 33.165 | 21.05 | 16.96 |
| 11 | 39.97 | 34.705 | 21.9 | — |
| 12 | 41.535 | 36.08 | 22.65 | — |
| 13 | — | 37.38 | — | — |

This disclosure is not limited to the above-described embodiments but is to be controlled by the limitations set forth in the following claims and any equivalents thereof. This disclosure may be suitably practiced in the absence of any element not specifically disclosed herein.

What is claimed is:

1. A shaped abrasive agglomerate particle comprising shaped abrasive particles bonded in a vitreous matrix, wherein the shaped abrasive particles have a longest particle lineal dimension on a surface and a shortest particle dimension perpendicular to the longest particle lineal dimension, wherein the longest particle lineal dimension is at least twice and up to ten times the shortest particle dimension, wherein the shaped abrasive agglomerate particle has a longest agglomerate lineal dimension on a surface and a shortest agglomerate dimension perpendicular to the longest agglomerate lineal dimension, and wherein the longest agglomerate lineal dimension is at least twice and up to ten times the shortest agglomerate dimension.

2. The shaped abrasive agglomerate particle of claim 1, wherein at least one of the following limitations is met:
the longest particle lineal dimension is at least three times the shortest particle dimension, or
the longest agglomerate lineal dimension is at least three times the shortest agglomerate dimension.

3. The shaped abrasive agglomerate particle of claim 1, wherein at least one of the shaped abrasive particles or the shaped agglomerate particle has a sloping side wall, and wherein at least one of the shaped abrasive particles or the shaped agglomerate particle has an angle in a range from 95 degrees to 130 degrees between a first face and the sloping side wall.

4. The shaped abrasive agglomerate particle of claim 1, wherein both of the shaped abrasive particles and the shaped agglomerate particle have a frusto-pyramidal shape.

5. The shaped abrasive agglomerate particle of claim 1, wherein the shaped abrasive particles comprise alpha alumina.

6. The shaped abrasive agglomerate particle of claim 1, wherein the shaped abrasive particles are present in a range from 70 percent by weight to 95 percent by weight and the vitreous matrix is present at least at five percent by weight, based on the weight of the shaped abrasive agglomerate particle.

7. The shaped abrasive agglomerate particle of claim 1, wherein the longest particle lineal dimension is up to 1600 micrometers, and wherein the longest agglomerate lineal dimension is up to 5 millimeters.

8. A method of making a plurality of the shaped abrasive agglomerate particles of claim 1, the method comprising:
filling a mold having a plurality of cavities with a slurry comprising a glass frit, the shaped abrasive particles, and a volatile liquid;
removing at least a portion of the volatile liquid to provide shaped precursor agglomerate particles; and
firing the shaped precursor agglomerate particles to provide the shaped abrasive agglomerate particles.

9. An abrasive article comprising a plurality of the shaped abrasive agglomerate particles of claim 1 retained in a binder.

10. The abrasive article of claim 9, wherein the abrasive article is a coated abrasive article, comprising a backing and the plurality of shaped abrasive agglomerate particles attached to the backing with a polymeric binder.

11. The abrasive article of claim 10, wherein the polymeric binder comprises a phenolic binder.

12. The abrasive article of claim 9, wherein the abrasive article comprises a nonwoven abrasive article.

13. The abrasive article of claim 9, wherein the abrasive article comprises a bonded abrasive article.

14. The abrasive article of claim 9, wherein the abrasive article is a belt, tape roll, disc, or sheet.

15. The method of claim 8, wherein the slurry further comprises a rheology modifier.

16. The shaped abrasive agglomerate particle of claim 1, wherein at least one of the shaped abrasive particles or the shaped agglomerate particle has a triangular frustum shape.

17. The shaped abrasive agglomerate particle of claim 1, wherein at least one of the shaped abrasive particles or the shaped agglomerate particle has a perimeter with an interior angle of less than 60 degrees.

18. The shaped abrasive agglomerate particle of claim 1, wherein the shaped abrasive particles comprise ceramic material.

19. The shaped abrasive agglomerate particle of claim 1, wherein the longest agglomerate lineal dimension on the surface is measured on a first edge of the agglomerate particle, wherein the shaped abrasive agglomerate particle further comprises a second, different edge having a lineal dimension, and wherein the lineal dimension of the second, different edge is also at least twice the shortest agglomerate dimension.

\* \* \* \* \*